(12) United States Patent
Abe

(10) Patent No.: US 12,478,565 B2
(45) Date of Patent: Nov. 25, 2025

(54) WATER-DISPERSION EMULSION COMPOSITION, METHOD FOR MANUFACTURING THE SAME, EMULSION ADDITION-CURED COMPOSITION, AND COSMETIC

(71) Applicant: SHIN-ETSU CHEMICAL CO., LTD., Tokyo (JP)

(72) Inventor: Takuya Abe, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 786 days.

(21) Appl. No.: 17/765,357

(22) PCT Filed: Sep. 10, 2020

(86) PCT No.: PCT/JP2020/034229
§ 371 (c)(1),
(2) Date: Mar. 30, 2022

(87) PCT Pub. No.: WO2021/075182
PCT Pub. Date: Apr. 22, 2021

(65) Prior Publication Data
US 2022/0387265 A1    Dec. 8, 2022

(30) Foreign Application Priority Data
Oct. 15, 2019    (JP) ................ 2019-188452

(51) Int. Cl.
| | |
|---|---|
| *A61K 8/04* | (2006.01) |
| *A61K 8/64* | (2006.01) |
| *A61K 8/891* | (2006.01) |
| *A61K 8/895* | (2006.01) |
| *A61Q 19/00* | (2006.01) |

(52) U.S. Cl.
CPC ............. *A61K 8/04* (2013.01); *A61K 8/64* (2013.01); *A61K 8/891* (2013.01); *A61K 8/895* (2013.01); *A61Q 19/00* (2013.01); *A61K 2800/594* (2013.01)

(58) Field of Classification Search
CPC . A61K 8/04; A61K 8/64; A61K 8/891; A61K 8/895; A61K 2800/594; A61Q 19/00
See application file for complete search history.

(56) References Cited

U.S. PATENT DOCUMENTS

| | | | | |
|---|---|---|---|---|
| 6,013,682 | A * | 1/2000 | Dalle | C08J 3/03 |
| | | | | 528/31 |
| 6,589,561 | B2 * | 7/2003 | Inokuchi | C08K 9/08 |
| | | | | 424/490 |
| 2004/0136943 | A1 | 7/2004 | Tomokuni | |
| 2008/0311060 | A1 * | 12/2008 | Sakuta | C08G 77/46 |
| | | | | 524/588 |
| 2010/0112023 | A1 | 5/2010 | Inokuchi et al. | |
| 2012/0321576 | A1 | 12/2012 | Sugiyama et al. | |
| 2014/0142016 | A1 | 5/2014 | Tomokuni et al. | |
| 2016/0199280 | A1 | 7/2016 | Yanagisawa et al. | |

(Continued)

FOREIGN PATENT DOCUMENTS

| | | |
|---|---|---|
| CN | 106068158 A | 11/2016 |
| CN | 109414391 A | 3/2019 |

(Continued)

OTHER PUBLICATIONS

Nov. 24, 2020 Search Report issued in International Patent Application No. PCT/JP2020/034229.

(Continued)

*Primary Examiner* — Michael P Cohen
(74) *Attorney, Agent, or Firm* — Oliff PLC

(57) ABSTRACT

A water-dispersion emulsion composition containing: (A) an anionic surfactant; (B) an organopolysiloxane having at least two hydrosilyl groups in one molecule thereof shown in formula (I); (C) an organopolysiloxane having at least two olefinic unsaturated groups in one molecule thereof shown in formula (II); (D) a monohydric or polyhydric alcohol; and (E) water, where the water-dispersion emulsion composition has a milky-white appearance at 25° C. and has emulsion particles that are spherical particles having an average particle size of 2.0 µm or less. This provides: a water-dispersion emulsion composition that gives a cosmetic having reduced stickiness, excellent feeling on use, refreshing feeling, and temporal stability, and particularly excellent cosmetic sustainability, abrasion resistance, and soft focus effect; an emulsion addition-cured composition obtained by addition-curing the same; and a cosmetic formulated with the emulsion addition-cured composition.

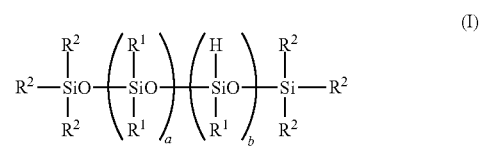

(I)

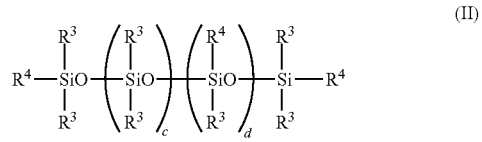

(II)

15 Claims, No Drawings

(56) References Cited

U.S. PATENT DOCUMENTS

| | | |
|---|---|---|
| 2016/0361698 A1 | 12/2016 | Yanagisawa et al. |
| 2019/0055362 A1 | 2/2019 | Igarashi |
| 2019/0133896 A1* | 5/2019 | Tsuji .................. A61K 8/06 |
| 2019/0375938 A1 | 12/2019 | Inokuchi |
| 2022/0062121 A1 | 3/2022 | Abe |

FOREIGN PATENT DOCUMENTS

| | | |
|---|---|---|
| JP | 2004-217640 A | 8/2004 |
| JP | 2009-196909 A | 9/2009 |
| JP | 2010-132877 A | 6/2010 |
| JP | 2010-222324 A | 10/2010 |
| JP | 2011-178769 A | 9/2011 |
| JP | 2013-032348 A | 2/2013 |
| JP | 2014-224061 A | 12/2014 |
| JP | 2015-105255 A | 6/2015 |
| JP | 2017-066085 A | 4/2017 |
| JP | 2017-145364 A | 8/2017 |
| JP | 2017-193702 A | 10/2017 |
| JP | 2020-100565 A | 7/2020 |
| WO | 2015/022936 A1 | 2/2015 |
| WO | WO-2018008653 A1 * | 1/2018 ............... A61K 8/06 |
| WO | 2018/135369 A1 | 7/2018 |

OTHER PUBLICATIONS

Apr. 19, 2022 International Preliminary Report on Patentability issued in International Patent Application No. PCT/JP2020/034229.

Oct. 4, 2022 Office Action Issued in Japanese Patent Application No. 2019-188452.

Jan. 1, 2025 Search Report issued in Chinese Patent Application No. 202080071622.7.

* cited by examiner

WATER-DISPERSION EMULSION COMPOSITION, METHOD FOR MANUFACTURING THE SAME, EMULSION ADDITION-CURED COMPOSITION, AND COSMETIC

TECHNICAL FIELD

The present invention relates to: a water-dispersion emulsion composition; a method for manufacturing the same; an emulsion addition-cured composition obtained by addition-curing the water-dispersion emulsion composition; and a cosmetic containing the same.

BACKGROUND ART

Transparent or translucent microemulsions containing a surfactant, an aqueous phase, and an oil phase are broadly divided into three types: a water-dispersion emulsion, whose continuous phase is water; an oil-dispersion emulsion, whose continuous phase is oil; and a bicontinuous emulsion, whose continuous phase is formed from water and oil. In particular, a microemulsion composition having a bicontinuous structure can achieve a cosmetic with improved functionality and feeling on use, and examples include compositions used for cleansing agents or cleaning agents of skin or hair (Patent Documents 1 to 7).

Bicontinuous microemulsion compositions require the use of a large amount of surfactant compared with water-dispersion emulsions or oil-dispersion emulsions. However, since stickiness or an oily feeling originating from an activator remain when used as a cosmetic, it is necessary to reduce the amount of surfactant used in order to maintain light feeling (Patent Document 8). In addition, when a silicone oil is used for the oil phase, feeling can be improved, but there are few reported examples, and the type of surfactant is limited.

A microemulsion composition containing a silicone oil can be produced by using Surfactin, which is a natural surfactant. Patent Document 9 reports an emulsified composition containing Surfactin, amino-modified silicone, and an aqueous solvent. The emulsified composition is characteristic in that the emulsified composition has a high emulsifying capacity, and a small amount of surfactant suffices. However, since the activator is anionic, a strong feeling of stickiness originating from the activator remains compared with a nonionic surfactant. In addition, usable silicones are limited, and there are no reported examples using an organopolysiloxane having a reactive functional group such as a hydrosilyl group or an olefinic unsaturated group.

Meanwhile, as a means to reduce stickiness, the use of silicone particles that can provide dry or smooth feeling on use and spreadability are known (Patent Documents 10 and 11). In particular, fine silicone particles formed by coating silicone rubber spherical particles with polyorganosilsesquioxane have soft feeling, and are excellent in dispersibility, and are therefore blended in many cosmetics. Production methods thereof go through a water-dispersion emulsion obtained by an Agent-in-Oil method exemplified by a phase inversion emulsification method, and there is no report disclosed of going through a water-dispersion emulsion obtained by a D phase emulsification method or a liquid crystal emulsification method.

CITATION LIST

Patent Literature

Patent Document 1: JP 2009-196909 A
Patent Document 2: JP 2015-105255 A
Patent Document 3: JP 2017-66085 A
Patent Document 4: JP 2004-217640 A
Patent Document 5: JP 2013-32348 A
Patent Document 6: JP 2014-224061 A
Patent Document 7: JP 2010-222324 A
Patent Document 8: JP 2011-178769 A
Patent Document 9: WO 2018/008653
Patent Document 10: JP 2010-132877 A
Patent Document 11: JP 2017-193702 A
Patent Document 12: WO 2015/022936

SUMMARY OF INVENTION

Technical Problem

The present invention has been made in view of the above-described circumstances, and an object thereof is to provide: a water-dispersion emulsion composition that gives a cosmetic having reduced stickiness, excellent feeling on use, refreshing feeling, and temporal stability, and particularly excellent cosmetic sustainability, abrasion resistance, and soft focus effect; an emulsion addition-cured composition obtained by addition-curing the same; and a cosmetic formulated with the emulsion addition-cured composition.

Solution to Problem

To achieve the object, the present invention provides a water-dispersion emulsion composition comprising:
(A) an anionic surfactant;
(B) an organopolysiloxane having at least two hydrosilyl groups in one molecule thereof shown in the following formula (I):

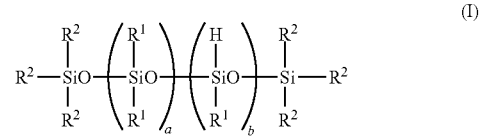

wherein each $R^1$ independently represents a substituted or unsubstituted monovalent hydrocarbon group having 1 to 30 carbon atoms and not having an aliphatic unsaturated bond, each $R^2$ independently represents a substituted or unsubstituted monovalent hydrocarbon group having 1 to 30 carbon atoms and not having an aliphatic unsaturated bond, some optionally being a hydrogen atom, "a" satisfies $0 \leq a \leq 300$, "b" satisfies $0 \leq b \leq 50$, and $5 \leq a+b \leq 350$, and when b=0, any two or more $R^2$ represent a hydrogen atom;
(C) an organopolysiloxane having at least two olefinic unsaturated groups in one molecule thereof shown in the following formula (II):

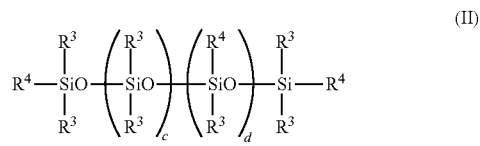

wherein each $R^3$ independently represents a substituted or unsubstituted monovalent hydrocarbon group having 1 to 30 carbon atoms and not having an aliphatic unsaturated bond, each $R^4$ independently represents a substituted or unsubstituted monovalent hydrocarbon group having 2 to 30 carbon atoms and having an aliphatic unsaturated bond or is $R^3$, "c" satisfies $0 \leq c \leq 500$, "d" satisfies $0 \leq d \leq 50$, and $5 \leq c+d \leq 550$, and when $d=0$, each $R^4$ independently represents a substituted or unsubstituted monovalent hydrocarbon group having 2 to 30 carbon atoms and having an aliphatic unsaturated bond;
(D) a monohydric or polyhydric alcohol; and
(E) water,
wherein the water-dispersion emulsion composition has a milky-white appearance at 25° C. and has emulsion particles that are spherical particles having an average particle size of 2.0 µm or less.

The inventive water-dispersion emulsion composition is manufactured through an emulsion composition obtained by D phase emulsification, so that the particles size of emulsion particles can be reduced easily. Furthermore, it is possible to produce an emulsion addition-cured composition by adding a hydrosilylation catalyst.

Furthermore, the water-dispersion emulsion composition is preferably dispersible when added in water.

Such a water-dispersion emulsion composition can be used suitably for cosmetics, etc.

Furthermore, the component (A) is preferably a natural surfactant.

Such a component (A) can reduce load on the environment, is highly safe, and can be used suitably in a water-dispersion emulsion composition.

In this event, the natural surfactant preferably comprises a cyclic peptide group shown in the following formula (III):

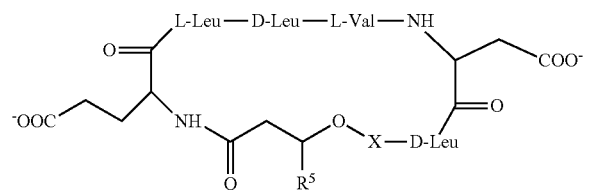

(III)

wherein in the formula, X represents an amino acid residue selected from leucine, isoleucine, and valine, each $R^5$ independently represents a substituted or unsubstituted monovalent hydrocarbon group having 9 to 18 carbon atoms and not having an aliphatic unsaturated bond, L-Leu indicates L-leucine, D-Leu indicates D-leucine, L-Val indicates L-valine, and a counter ion of a carboxy group comprises an alkali metal ion.

When the natural surfactant is a natural surfactant that can be shown by the formula (III) as described, the natural surfactant can be used more suitably in an emulsion composition having an average particle size of 2.0 µm or less.

In this event, in the formula (III), X preferably represents leucine, and $R^5$ preferably represents a hydrocarbon chain having 12 carbon atoms.

When the natural surfactant shown in the formula (III) is as described, the natural surfactant can be used further suitably in an emulsion composition that has emulsion particles having an average particle size of 2.0 µm or less.

Furthermore, the component (A) in the water-dispersion emulsion composition is preferably contained in an amount of 0.1 to 10 wt %.

When the component (A) is contained in such an amount, sufficient emulsion that has emulsion particles having an average particle size of 2.0 µm or less can be formed.

Furthermore, the component (D) is preferably glycerin.

When the component (D) is as described, a D phase (surfactant phase) can be formed in a wide range of concentrations.

Furthermore, the emulsion particles preferably have an average particle size of 1.0 µm or less.

Moreover, the emulsion particles more preferably have an average particle size of 500 nm or less.

Such emulsion particles go into sulci cutis more easily when used in a cosmetic, and improve adhesiveness to skin.

Furthermore, there is preferably 0.5 to 3.0 mol of the hydrosilyl groups contained in the component (B) relative to 1 mol of the olefinic unsaturated groups contained in the component (C).

When the hydrosilyl groups contained in the (B) is contained in such a molar quantity, an addition-curing reaction progresses sufficiently when the emulsion composition is addition-cured, and sufficient feeling can be achieved.

Furthermore, the water-dispersion emulsion composition is preferably addition-cured by adding (F) a hydrosilylation catalyst.

Thus, the water-dispersion emulsion composition can be addition-cured by adding the component (F).

The present invention also provides a method for manufacturing a water-dispersion emulsion composition comprising the steps of:
(1) preparing a mixed liquid containing the components (A) to (D);
(2) adding the component (E) to the mixed liquid to obtain a transparent or translucent emulsion composition α; and
(3) further adding the component (E) to the emulsion composition α to obtain the above-described water-dispersion emulsion composition.

According to such a manufacturing method, a water-dispersion emulsion composition having a smaller particle size can be manufactured easily.

In this event, the emulsion composition α preferably has a bicontinuous structure.

In this manner, the particle size of the emulsion particles of the obtained water-dispersion emulsion composition can be made finer and more uniform.

In addition, the present invention provides a method for manufacturing an emulsion addition-cured composition, the method being the above-described method for manufacturing a water-dispersion emulsion composition further comprising a step of adding (F) a hydrosilylation catalyst.

In this manner, it is possible to manufacture easily an emulsion addition-cured composition that can be suitably used for a cosmetic having reduced stickiness, excellent feeling on use, refreshing feeling, and temporal stability, and particularly excellent cosmetic sustainability, abrasion resistance, and soft focus effect.

In addition, the present invention provides an emulsion addition-cured composition obtained by addition-curing the above-described water-dispersion emulsion composition, wherein the emulsion addition-cured composition has a milky-white appearance at 25° C. and has emulsion particles that are spherical particles having an average particle size of 2.0 µm or less.

Such an emulsion addition-cured composition has reduced stickiness originating from the anionic surfactant.

Furthermore, an extract that is obtained when addition-cured materials of the component (B) and the component (C) are extracted from the emulsion addition-cured composition is preferably solid.

Such an emulsion addition-cured composition can be suitably blended in a cosmetic as a feeling improver.

In this event, the solid extract preferably has a shape of spherical particles.

Such an emulsion addition-cured composition can give a cosmetic having a more excellent feeling on use.

In addition, the present invention provides a cosmetic comprising the above-described emulsion addition-cured composition.

A cosmetic having the above-described emulsion addition-cured composition blended as described has reduced stickiness originating from the anionic surfactant, a favorable feeling on use, refreshing feeling, and temporal stability, good cosmetic sustainability, good spreadability and finish, and excellent abrasion resistance and soft focus effect.

Advantageous Effects of Invention

The inventive water-dispersion emulsion composition allows, by addition of a hydrosilylation catalyst, an addition-curing reaction while maintaining the particle size of before the curing, and an emulsion addition-cured composition can be produced. A cosmetic having the emulsion addition-cured composition blended has reduced stickiness originating from the anionic surfactant, and is excellent in feeling on use and refreshing feeling. In particular, since the emulsion is in spherical particles, the cosmetic easily enters gaps in skin, so that the cosmetic has favorable adhesiveness and temporal stability, and is excellent in cosmetic sustainability, abrasion resistance, and soft focus effect.

DESCRIPTION OF EMBODIMENTS

As described above, there have been demands for the development of a water-dispersion emulsion composition that gives a cosmetic having reduced stickiness, excellent feeling on use, refreshing feeling, and temporal stability, and particularly excellent cosmetic sustainability, abrasion resistance, and soft focus effect; an emulsion addition-cured composition obtained by addition-curing the same; and a cosmetic formulated with the emulsion addition-cured composition.

To achieve the above object, the present inventor has earnestly studied and found out that when organopolysiloxanes shown by the formulae (I) and (II) having reactive functional groups such as hydrosilyl groups and olefinic unsaturated groups are an oil phase, it is possible to provide easily a water-dispersion emulsion composition that has a milky-white appearance at 25° C. and the obtained emulsion is in the form of spherical particles having an average particle size of 2.0 μm or less.

In addition, the present inventor has found out that by adding a hydrosilylation catalyst to the water-dispersion emulsion composition, an emulsion addition-cured composition can be produced while maintaining the particle size of before the curing. The present inventor has further found out that the obtained cosmetic containing the emulsion addition-cured composition has reduced stickiness originating from an activator, excellent feeling on use, refreshing feeling, and temporal stability, and particularly excellent cosmetic sustainability, abrasion resistance, and soft focus effect. Thus, the present invention has been conceived.

That is, the present invention is a water-dispersion emulsion composition comprising:
(A) an anionic surfactant;
(B) an organopolysiloxane having at least two hydrosilyl groups in one molecule thereof shown in the following formula (I):

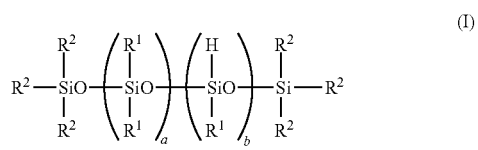

wherein each $R^1$ independently represents a substituted or unsubstituted monovalent hydrocarbon group having 1 to 30 carbon atoms and not having an aliphatic unsaturated bond, each $R^2$ independently represents a substituted or unsubstituted monovalent hydrocarbon group having 1 to 30 carbon atoms and not having an aliphatic unsaturated bond, some optionally being a hydrogen atom, "a" satisfies $0 \leq a \leq 300$, "b" satisfies $0 \leq b \leq 50$, and $5 \leq a+b \leq 350$, and when b=0, any two or more $R^2$ represent a hydrogen atom;
(C) an organopolysiloxane having at least two olefinic unsaturated groups in one molecule thereof shown in the following formula (II):

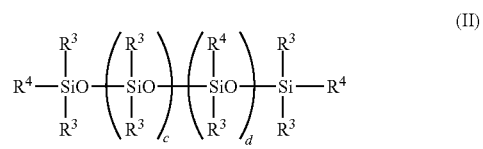

wherein each $R^3$ independently represents a substituted or unsubstituted monovalent hydrocarbon group having 1 to 30 carbon atoms and not having an aliphatic unsaturated bond, each $R^4$ independently represents a substituted or unsubstituted monovalent hydrocarbon group having 2 to 30 carbon atoms and having an aliphatic unsaturated bond or is $R^3$, "c" satisfies $0 \leq c \leq 500$, "d" satisfies $0 \leq d \leq 50$, and $5 \leq c+d \leq 550$, and when d=0, each $R^4$ independently represents a substituted or unsubstituted monovalent hydrocarbon group having 2 to 30 carbon atoms and having an aliphatic unsaturated bond;
(D) a monohydric or polyhydric alcohol; and
(E) water,
wherein the water-dispersion emulsion composition has a milky-white appearance at 25° C. and has emulsion particles that are spherical particles having an average particle size of 2.0 μm or less.

Hereinafter, the present invention will be described in detail. However, the present invention is not limited thereto.
[Component (A)]

The anionic surfactant (A) used in the present invention has an anionic hydrophilic group in the molecular structure thereof, and has a hydrophobic group including a linear or branched hydrocarbon chain, an aromatic ring, or a heterocycle, and a composite thereof. Examples include a fatty acid soap such as sodium stearate and triethanolamine palmitate, an alkyl ether carboxylic acid and a salt thereof, a condensate between an amino acid and a fatty acid, an alkane sulfonate, an alkene sulfonate, a sulfonate of a fatty acid ester, a sulfonate of a fatty acid amide, a sulfonate of a formalin condensate, an alkyl sulfate ester salt, a sulfate ester salt of a secondary alcohol, a sulfate ester salt of an alkyl and an allyl ether, a sulfate ester salt of a fatty acid ester, a sulfate ester salt of a fatty acid alkylolamide, a sulfate ester salt of a Turkey red oil and so on, an alkyl phosphate salt, an ether phosphate salt, an alkyl allyl ether phosphate salt, an amide phosphate salt, an N-acyl lactate, an N-acyl sarcosinate, an N-acylamino acid activator, and natural surfactants exemplified by lecithin, bile acid, and Surfactin. One of these can be used or a combination of two or more thereof can be used. In particular, a natural surfactant is preferably used.

A natural surfactant is a surfactant derived from a biological component that is said to be highly safe, since a natural surfactant reduces load on the environment. Natural surfactants have a peculiar chemical structure in that natural surfactants are bulky and have polyfunctionality compared with common synthetic surfactants, and do not contain components derived from petroleum. Therefore, natural surfactants have characteristics such as special functionality, biodegradability, low toxicity, and bioactivity, and are attracting attention in recent years. Specific examples include lecithin, bile acid, Surfactin, etc., and among these natural surfactants, Surfactin is particularly favorably used.

Surfactin is a natural surfactant containing a cyclic peptide group shown in the following formula (III). Surfactin is a biosurfactant produced from *Bacillus subtilis*, and has a hydrophilic part having a cyclic peptide structure with seven amino acids as constituents and a hydrophobic part including a hydrocarbon group. Surfactin is a general term for compounds having hydrocarbon groups of different alkyl chain lengths and branching degree. Surfactin Na, being a sodium salt, has low skin irritation compared with other anionic surfactants. In addition, Surfactin Na has a characteristic that the critical micelle concentration shows an extremely low value of 0.0003 wt % by cyclic peptide structures attracting each other between molecules by hydrogen bonds.

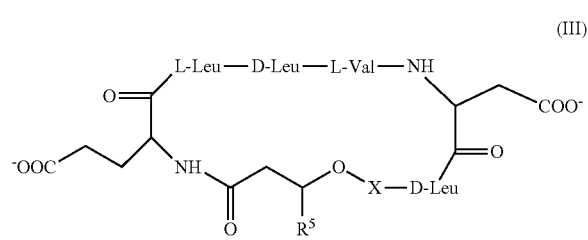

(III)

In the formula, X represents an amino acid residue selected from leucine, isoleucine, and valine, each $R^5$ independently represents a substituted or unsubstituted monovalent hydrocarbon group having 9 to 18 carbon atoms and not having an aliphatic unsaturated bond, L-Leu indicates L-leucine, D-Leu indicates D-leucine, L-Val indicates L-valine, and a counter ion of a carboxy group includes an alkali metal ion.

X represents an amino acid residue selected from leucine, isoleucine, and valine, preferably leucine.

Each $R^5$ independently represents a substituted or unsubstituted monovalent hydrocarbon group having 9 to 18 carbon atoms and not having an aliphatic unsaturated bond. Examples include alkyl groups, aryl groups, and aralkyl groups having 9 to 18 carbon atoms. More specific examples include a nonyl group, a decyl group, an undecyl group, a dodecyl group, a tridecyl group, a tetradecyl group, and the like. In particular, a nonyl group, a decyl group, an undecyl group, and a dodecyl group, having 9 to 12 carbon atoms, are preferable.

In the natural surfactant (Surfactin) containing the cyclic peptide group shown in the formula (III), the amino acid residue is preferably leucine and $R^5$ preferably represents a branched hydrocarbon chain having 12 carbon atoms, and more preferably, a counter ion of the carboxy group is a sodium ion. Those disclosed in Patent Document 12 can be used, for example. Such substances are not limited to the following example, but "KANEKA Surfactin" manufactured by Kaneka Corporation can be used, for example.

[Component (B)]

The organopolysiloxane (B) having at least two hydrosilyl groups in one molecule thereof used in the present invention is shown by the following formula (I):

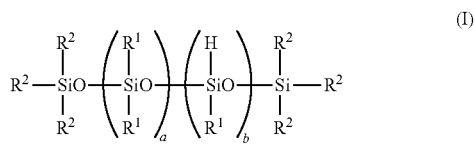

(I)

where each R independently represents a substituted or unsubstituted monovalent hydrocarbon group having 1 to 30 carbon atoms and not having an aliphatic unsaturated bond, each $R^2$ independently represents a substituted or unsubstituted monovalent hydrocarbon group having 1 to 30 carbon atoms and not having an aliphatic unsaturated bond, some optionally being a hydrogen atom, "a" satisfies $0 \leq a \leq 300$, "b" satisfies $0 \leq b \leq 50$, and $5 \leq a+b \leq 350$, and when b=0, any two or more $R^2$ represent a hydrogen atom, and when b=1, any one or more $R^2$ represent a hydrogen atom.

In the formula (I), each $R^1$ independently represents a substituted or unsubstituted monovalent hydrocarbon group having 1 to 30 carbon atoms, preferably 1 to 10 carbon atoms and not having an aliphatic unsaturated bond. Examples include alkyl groups, aryl groups, and aralkyl groups having 1 to 30 carbon atoms, or a group obtained by substituting a hydrogen atom bonded to a carbon atom of these groups with a halogen atom, an amino group, or a carboxy group. In particular, alkyl groups, aryl groups, and aralkyl groups having 1 to 10 carbon atoms, fluorine-substituted alkyl groups, chloro-substituted alkyl groups, amino-substituted alkyl groups, and carboxyl-substituted alkyl groups are preferable. More specific examples include a methyl group, an ethyl group, a propyl group, a butyl group, a pentyl group, a cyclopentyl group, a cyclohexyl group, a phenyl group, a tolyl group, a trifluoropropyl group, a heptadecafluorodecyl group, a chloropropyl group, a chlorophenyl group, and the like. In particular, an alkyl group having 1 to 5 carbon atoms, a phenyl group, or a trifluoropropyl group is preferable.

In the formula (I), each $R^2$ independently represents a substituted or unsubstituted monovalent hydrocarbon group having 1 to 30 carbon atoms, preferably 1 to 10 carbon atoms and not having an aliphatic unsaturated bond, or represents a hydrogen atom. Examples of the hydrocarbon group include alkyl groups, aryl groups, and aralkyl groups having 1 to 30 carbon atoms, or a group obtained by substituting a hydrogen atom bonded to a carbon atom of these groups with a halogen atom, an amino group, or a carboxy group. In particular, alkyl groups, aryl groups, and aralkyl groups having 1 to 10 carbon atoms, fluorine-substituted alkyl groups, chloro-substituted alkyl groups, amino-substituted alkyl groups, and carboxyl-substituted alkyl groups are preferable. More specific examples include a methyl group, an ethyl group, a propyl group, a butyl group, a pentyl group, a cyclopentyl group, a cyclohexyl group, a phenyl group, a tolyl group, a trifluoropropyl group, a heptadecafluorodecyl group, a chloropropyl group, a chlorophenyl group, and the like. In particular, an alkyl group having 1 to 5 carbon atoms, a phenyl group, a trifluoropropyl group, or a hydrogen atom is preferable.

In the formula (I), "a" satisfies 0≤a≤300, preferably 10≤a≤100. If "a" is greater than 300, the molecular structure becomes large, so that stability after emulsification becomes poor. "b" satisfies 0≤b≤50, preferably 0≤b≤30. If "b" is greater than 50, the number of crosslinking points in addition reaction becomes large, and therefore, the obtained cured material becomes hard so that feeling becomes poor. a+b satisfies 5≤a+b≤350, preferably 10≤a+b≤150. If a+b is less than 5, the molecular weight of the cured material after the addition reaction becomes low, so that the quality of the obtained cured material becomes close to liquid, and feeling becomes poor. If a+b is greater than 350, the molecular structure becomes large, and therefore, stability after emulsification becomes poor.

[Component (C)]

The organopolysiloxane (C) having at least two olefinic unsaturated groups in one molecule thereof used in the present invention is shown in the following formula (II):

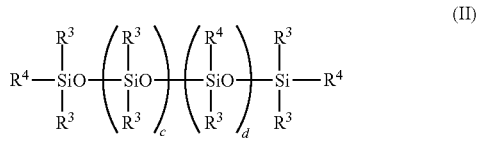

(II)

where each $R^3$ independently represents a substituted or unsubstituted monovalent hydrocarbon group having 1 to 30 carbon atoms and not having an aliphatic unsaturated bond, each $R^4$ independently represents a substituted or unsubstituted monovalent hydrocarbon group having 2 to 30 carbon atoms and having an aliphatic unsaturated bond or is $R^3$, "c" satisfies 0≤c≤500, "d" satisfies 0≤d≤50, and 5≤c+d≤550, and when d=0, each $R^4$ independently represents a substituted or unsubstituted monovalent hydrocarbon group having 2 to 30 carbon atoms and having an aliphatic unsaturated bond.

In the formula (II), each $R^3$ independently represents a substituted or unsubstituted monovalent hydrocarbon group having 1 to 30 carbon atoms, preferably 1 to 10 carbon atoms and not having an aliphatic unsaturated bond. Examples include alkyl groups, aryl groups, and aralkyl groups having 1 to 30 carbon atoms, or a group obtained by substituting a hydrogen atom bonded to a carbon atom of these groups with a halogen atom, an amino group, or a carboxy group. In particular, alkyl groups, aryl groups, and aralkyl groups having 1 to 10 carbon atoms, fluorine-substituted alkyl groups, chloro-substituted alkyl groups, amino-substituted alkyl groups, and carboxyl-substituted alkyl groups are preferable. More specific examples include a methyl group, an ethyl group, a propyl group, a butyl group, a pentyl group, a cyclopentyl group, a cyclohexyl group, a phenyl group, a tolyl group, a trifluoropropyl group, a heptadecafluorodecyl group, a chloropropyl group, a chlorophenyl group, and the like. In particular, an alkyl group having 1 to 5 carbon atoms, a phenyl group, or a trifluoropropyl group is preferable.

Furthermore, in the formula (II), each $R^4$ independently represents a substituted or unsubstituted monovalent hydrocarbon group having 2 to 30 carbon atoms, preferably 2 to 10 carbon atoms having an aliphatic unsaturated bond or is a similar group to $R^3$. Examples of the hydrocarbon group having an aliphatic unsaturated bond include a vinyl group, an allyl group, a propenyl group, a hexenyl group, a styryl group, and the like. In particular, a vinyl group is preferable. When $R^4$ is the same as $R^3$, $R^4$ is as described above.

In the formula (II), "c" satisfies 0≤c≤500 and "d" satisfies 0≤d≤50. "c" satisfies 0≤c≤500, preferably 10≤c≤400. If "c" is greater than 500, the molecular structure becomes large, so that stability after emulsification becomes poor. "d" satisfies 0≤d≤50, preferably 0≤d≤30, further preferably 0≤d≤10. If "d" is greater than 50, the number of crosslinking points in addition reaction becomes large, and therefore, the obtained cured material becomes hard so that feeling becomes poor. c+d satisfies 5≤c+d≤550, preferably 10≤c+d≤400. If c+d is less than 5, the molecular weight of the cured material after the addition reaction becomes low, so that the quality of the obtained cured material becomes close to liquid, and feeling becomes poor. If c+d is greater than 550, the molecular structure becomes large, and therefore, stability after emulsification becomes poor.

[Component (D)]

Examples of the monohydric or polyhydric alcohol (D) used in the present invention include generally used monohydric alcohols and polyhydric alcohols. Specific examples include a lower or higher, primary alcohol, sugar alcohols such as erythritol, maltitol, xylitol, and sorbitol, and polyhydric alcohols such as 1,3-BG, glycerin, PG, and DPG. One of these can be used or an appropriate combination of two or more thereof can be used. In particular, a water-soluble polyhydric alcohol is preferably used.

As the polyhydric alcohol, one of 1,2-alkanediol having 5 to 10 carbon atoms and a polyhydric alcohol other than 1,2-alkanediol having 5 to 10 carbon atoms or a combination of two or more thereof is preferably used. When a polyhydric alcohol is used, HLB (Hydrophilic-Liphilic Balance) can be adjusted by combining with an anionic surfactant (A), and a D phase can be easily formed.

Specific examples of the 1,2-alkanediol having 5 to 10 carbon atoms include 1,2-pentanediol, 1,2-hexanediol, 1,2-heptanediol, 1,2-octanediol, 1,2-nonanediol, and 1,2-decanediol. In particular, one or more out of 1,2-hexanediol, 1,2-heptanediol, and 1,2-octanediol is preferably used.

The polyhydric alcohol other than 1,2-alkanediol having 5 to 10 carbon atoms is not particularly limited as long as the polyhydric alcohol is used as raw material for cosmetics. Examples thereof include ethylene glycol, diethylene glycol, polyethylene glycol, propylene glycol, dipropylene glycol, polypropylene glycol, glycerin, diglycerin, polyglycerin, 1,3-butyleneglycol, isoprene glycol, sorbitol, mannitol, and glycol. In particular, dipropylene glycol, glycerin, and 1,3-butyleneglycol are preferable. Furthermore, glycerin is particularly preferable since a D phase can be formed in a wide range of concentrations when glycerin is used.

The total amount of the monohydric or polyhydric alcohol (D) blended is preferably 1.0 to 70 mass %, more preferably 5 to 50 mass % of the cosmetic. When the blended amount is 1.0 mass % or more, a D phase can be formed easily.

[Water-Dispersion Emulsion Composition and Method for Manufacturing the Same]

The present invention is a water-dispersion emulsion composition containing the components (A) to (E), and the water-dispersion emulsion composition has a milky-white appearance at 25° C. and has emulsion particles that are spherical particles having an average particle size of 2.0 μm or less.

A common emulsifying and dispersing apparatus can be used for emulsification, and examples thereof include high-speed rotary centrifugal stirrers such as a homogenizing disper, high-speed rotary shear stirrers such as a homomixer, high-pressure jetting emulsifying and dispersing apparatuses such as a homogenizer, a colloid mill, an ultrasonic emulsifier, and the like.

When mixing the five components (A) to (E), a phase inversion temperature emulsification method, a D phase emulsification method, or the like can be employed (emulsification step).

A phase inversion temperature emulsification method is a method of stirring near a phase inversion temperature (PIT) at which the HLB becomes balanced, and then cooling quickly to produce a fine emulsion. Near a PIT, the surface tension between oil and water becomes remarkably low, and therefore, fine emulsified particles are easily produced.

A D phase emulsification method is a method of adding water-soluble polyhydric alcohol to a surfactant to adjust the HLB of the surfactant and form a D phase, then adding oil to go through an O/D emulsion and adding water to produce a fine emulsion.

For a soft focus effect in cosmetics, it is known that the smaller the average particle size of the emulsion particles, the more advantageous. In order to produce spherical particles having a small particle size by phase inversion temperature emulsification, it is necessary to increase the amount of activator or increase the shearing force at the time of mechanical emulsification. On the other hand, however, this leads to stickiness and energy loss. From the above reasons, the D phase emulsification method is more preferable since it is possible to produce, with low energy and a small amount of activator, an emulsion formed from spherical particles having a small particle size.

Accordingly, the present invention provides a method for manufacturing a water-dispersion emulsion composition including the steps of:
(1) preparing a mixed liquid containing the components (A) to (D);
(2) adding the component (E) to the mixed liquid to obtain a transparent or translucent emulsion composition α; and
(3) further adding the component (E) to the emulsion composition α to obtain the above-described water-dispersion emulsion composition.

In the D phase emulsification method, specifically, the organopolysiloxanes of component (B) and component (C) are blended gradually under conditions of shearing with a homogenizing disper into a mixture of component (A) an anionic surfactant and a polyhydric alcohol as component (D) to form a D phase (i.e. a mixed liquid containing the components (A) to (D) is prepared (the step (1)). An emulsion composition α (hereinafter, also referred to as a microemulsion composition α) can be obtained by subsequently adding a predetermined amount of water (E) gradually (the step (2)).

The emulsion composition α has a transparent or translucent appearance, and the average particle size or structural period of the microemulsion is 200 nm or less. At the stage where the water (E) is being added to a white D phase gel containing (A) to (D), the composition goes through a transparent or translucent microemulsion composition α, and finally undergoes phase transition to a milky-white water-dispersion emulsion by further adding water (E) (the step (3)). By adding an appropriate amount of the water (E), the transparent or translucent microemulsion turns milky-white, and in this case, there is a high possibility that a water-dispersion emulsion has been obtained.

The inventive water-dispersion emulsion composition has a milky-white appearance, and emulsion particles thereof are spherical particles having an average particle size of 2.0 µm or less. In addition, the composition can be obtained maintaining the particle size even when the water (E) is further added.

When further adding the water (E) to the obtained milky-white water-dispersion emulsion composition, the water (E) may be added to the water-dispersion emulsion composition or the water-dispersion emulsion composition may be added to the water (E). It is unlikely that the average particle size of the emulsion composition will exceed 2.0 µm by a change in the order of the addition. In addition, particle size does not greatly change depending on the amount of the water (E).

Furthermore, in the inventive method for manufacturing a water-dispersion emulsion composition, the emulsion composition α preferably has a bicontinuous structure.

There are three types of microemulsions: an aqueous micelle solution phase, where oil is made soluble in water; a reverse micelle oil solution phase, where water is made soluble in oil; and a bicontinuous phase, where both water and oil take on a continuous structure, and a microemulsion falls under one of these phases.

Whether a microemulsion composition α is aqueous or oily can be determined by the following method. When several drops of the microemulsion composition α are rapidly dispersed homogeneously to excess water after being dropped thereto and are not dispersed to excess oil after being dropped thereto, it is aqueous. On the other hand, when they are rapidly dispersed homogeneously to excess oil after being dropped thereto and are not dispersed to excess water after being dropped thereto, it is oily. An aqueous micelle solution, where oil is made soluble in water, is aqueous since the aqueous micelle solution is rapidly dispersed when added in water, and is not dispersed when added in oil. In the case of a reverse micelle oil solution phase, where water is made soluble in oil, the reverse micelle oil solution phase is oily since it is not dispersed when added in water, and is rapidly dispersed when added in oil. A bicontinuous phase, where both water and oil take on a continuous structure, is either aqueous or oily. The microemulsion composition α used in the present invention is preferably dispersed when added in water, is further preferably an aqueous micelle solution phase, where oil is made soluble in water or a bicontinuous phase, and is particularly preferably a bicontinuous phase.

Furthermore, whether a microemulsion composition α is an aqueous micelle solution phase or a bicontinuous phase can be determined by the following method. It can be confirmed that the composition has a bicontinuous structure by observing an electron microscope image using a freeze-fracture replica technique of known method. More conveniently, it can be confirmed by a solubility test of pigments. The solubility test of pigments is a method of adding each of aqueous pigments and oily pigments to confirm that the composition is amphiphilic when it is rapidly mixed with both of water and oil.

When the microemulsion composition α has a bicontinuous structure dispersible in water, the particle size of the emulsion particles of the water-dispersion emulsion composition obtained by mixing with water has a characteristic of being fine and homogeneous. Therefore, when the inventive water-dispersion emulsion composition is manufactured by going through such a microemulsion composition α, the average particle size of the emulsion particles is 2.0 µm or less, and the particle size distribution is extremely narrow.

In addition, the inventive water-dispersion emulsion composition has characteristics of being spherical particles having an emulsion average particle size of 2.0 µm or less, preferably 1.0 µm or less, further preferably 500 nm or less.

If the particle size exceeds 2.0 μm, there is risk that when used in a cosmetic, the cosmetic does not easily go into sulci cutis, and that adhesiveness to skin is degraded. The lower limit of the emulsion average particle size is not particularly limited, but the emulsion average particle size preferably exceeds 200 nm, and further preferably exceeds 300 nm. When the emulsion average particle size is within the above range, spherical particles that have got into sulci cutis easily come off when cleaned. Therefore, this range is preferred.

When D phase emulsification is performed using a common polyglycerin fatty acid ester or fatty acid polyoxyethylene glyceryl, the average particle size of the emulsion particles in the produced emulsion composition tends to be small: about several ten to several hundred nm. On the other hand, in the case of D phase emulsification using the anionic surfactant (A) of the present invention, the anionic surfactant such as Surfactin has a three-dimensional bulky structure, so that the emulsion particles of the inventive water-dispersion emulsion composition have a large particle size in comparison.

Furthermore, the inventive water-dispersion emulsion composition is preferably dispersible when added in water. The inventive water-dispersion emulsion composition is preferably aqueous, and judgement on whether the composition is aqueous or oily and judgement on whether the composition is an aqueous micelle solution phase or a bicontinuous phase can be given by the same method as the microemulsion composition α as described above.

In the above-described emulsification step, the average particle size is determined by the composition proportions of (A) to (D). For example, when the amount of (A) is increased relatively or when the amounts of (B) and (C) are reduced relatively, the average particle size of the emulsion composition becomes small. Meanwhile, when the amount of (A) is reduced relatively or when the amounts of (B) and (C) are increased relatively, the average particle size of the emulsion composition becomes large, while on the other hand, emulsification stability is degraded. From the above reason, the upper limit of the emulsion particle size for achieving an emulsion composition having excellent stability in the present invention is about 2.0 μm. In addition, it is possible to change the dilution concentration by the amount of the water (E), and it is unlikely this will affect the particle size. Note that in the present invention, the average particle size of the emulsion particles is the value of a median diameter measured by a laser diffraction scattering type particle size analyzer LA-960 (manufactured by HORIBA, Ltd.).

In the inventive water-dispersion emulsion composition, 0.1 to 10 mass % of the anionic surfactant (A) is preferably contained, further preferably 0.1 to 5 mass %. An emulsion having a fine particle size can be formed with a small amount added since the surfactant is excellent in emulsification performance.

In the inventive water-dispersion emulsion composition, the content ratio of each component (B), (C), (D), and (E) is not particularly limited, but is preferably 10 to 500 parts by mass of the component (B) organopolysiloxane, 10 to 1000 parts by mass of the component (C) organopolysiloxane, 10 to 500 parts by mass of the component (D) monohydric or polyhydric alcohol, and 10 to 1600 parts by mass of the component (E) water relative to 10 parts by mass of the component (A) anionic surfactant. In particular, regarding the component (E) water, the emulsion composition α is preferably obtained at a stage where 10 to 800 parts by mass of the water has been added in the above-described manufacturing method (i.e. the D phase emulsification method).

[Emulsion Addition-Cured Composition and Method for Manufacturing the Same]

In addition, the present invention provides an emulsion addition-cured composition obtained by addition-curing the above-described water-dispersion emulsion composition, where the emulsion addition-cured composition has a milky-white appearance at 25° C. and has emulsion particles that are spherical particles having an average particle size of 2.0 μm or less.

The inventive water-dispersion emulsion composition is preferably addition-cured by a hydrosilylation reaction by adding (F) a hydrosilylation catalyst. The hydrosilylation catalyst (F) can be added after the above-described step of emulsifying the water-dispersion emulsion composition.

An emulsion addition-cured composition obtained by addition-curing the water-dispersion emulsion composition containing the components (B) and (C) can suppress influence to the phases of the emulsion due to generation of heat or contraction of the structure that accompany the addition-curing reaction, and particle size can be sustained after the reaction.

There is preferably 0.5 to 3.0 mol, preferably 0.5 to 1.5 mol of the hydrosilyl groups contained in the component (B) relative to 1 mol of the olefinic unsaturated groups contained in the component (C). When the amount of the hydrosilyl groups is 0.5 mol or more, the subsequent addition-curing reaction progresses sufficiently, and sufficient feeling can be achieved. In addition, when the amount of the hydrosilyl groups is 3.0 mol or less, there is no generation of hydrogen gas over time due to many hydrosilyl groups remaining.

The hydrosilylation reaction is preferably performed in the presence of a platinum group metal-based catalyst such as a platinum catalyst or a rhodium catalyst, etc. As the hydrosilylation catalyst (F), a chloroplatinic acid, an alcohol-modified chloroplatinic acid, a chloroplatinic acid-vinylsiloxane complex, etc. are preferable, for example. Furthermore, regarding the amount of the catalyst used, the amount of platinum or rhodium is preferably 50 ppm or less, particularly preferably 20 ppm or less relative to the total amount of the water-dispersion emulsion composition. When the amount of the catalyst used is as described, coloring of the sample due to an excess amount being contained can be suppressed.

Since the above-mentioned metal-based catalysts are hydrophobic, the curing reaction rate is sometimes slow when added directly in a water-dispersion emulsion composition. Therefore, it is preferable to raise the reaction rate by coating the catalyst with a dispersant such as a nonionic surfactant.

The platinum group metal-based catalyst can be added after the emulsification step as described above, but can also be dissolved with the component (B) and the component (C) beforehand. When the platinum group metal-based catalyst is added after the emulsification step, it is possible to dissolve in a solvent and then add. In addition, when dispersibility in water is poor, it is preferable to add the platinum group metal-based catalyst in a state of being dissolved in a nonionic surfactant (such as a polyoxyethylene lauryl ether, for example). When the platinum group metal-based catalyst is dissolved with the component (B) and the component (C) beforehand, it is preferable to keep cooled to a low temperature of 5° C. or lower, for example, so that an addition reaction does not occur before the emulsification step is ended.

The addition reaction can be performed at room temperature, for example 20 to 25° C. The stirring time for the reaction is not particularly limited, but is usually 1 to 24 hours. When the reaction does not complete, the reaction can be performed under heating at lower than 100° C. By performing the reaction in such a temperature range, the structure of the emulsion can be prevented more certainly from collapsing.

[Physical Properties of Emulsion Addition-Cured Composition]

By blending the inventive emulsion addition-cured composition in a cosmetic as a feeling improver, stickiness arising from a surfactant is reduced, and a cosmetic excellent in feeling on use, refreshing feeling, and temporal stability can be achieved.

The inventive emulsion addition-cured composition is preferably such a composition that when addition-cured materials of the component (B) and the component (C) are extracted from the emulsion addition-cured composition, the obtained extract is solid. Hereinafter, a detailed description will be given.

The physical form of the addition-cured material of the component (B) and the component (C) contained in the above composition is one of liquid, gum, or solid. From the viewpoint of blending in a cosmetic as a feeling improver, the physical form of the addition-cured material is preferably gum or solid, particularly preferably solid. When the physical form is solid, the shape is preferably particulate in view of feeling on use. Techniques for checking the physical form include, for example, a technique of dropping the emulsion composition into an alcohol or the like exemplified by ethanol. In that case, the emulsion breaks down, the oil phase inside is precipitated, and the physical form after the addition-curing can be observed. The principle of this technique is assumed to be that the activator is desorbed by the ethanol being adsorbed to a water/oil interface, and the emulsion breaking down due to losing activating property. When the component (A) and the component (D) are soluble in ethanol, the components can be removed easily by filtration, so that a cleaning operation can be omitted. Alternatively, there is also a technique of drying the emulsion composition to volatilize the water, which is an external phase of the emulsion addition-cured composition. When the component (A) and the component (D) are non-volatile components, the components remain. Therefore, cleaning with a water-soluble solvent is necessary afterwards. The shape of the addition-cured material can be observed with a scanning electron microscope (SEM) or a transmission electron microscope (TEM).

[Cosmetics]

Furthermore, the present invention provides a cosmetic containing the above-described emulsion addition-cured composition.

The inventive emulsion addition-cured composition can be used for various uses, and in particular, is applicable as a raw material of all cosmetics externally used for the skin or hair. In this case, the blended amount of the emulsion addition-cured composition is preferably 0.1 to 40 mass % of the total cosmetic, further preferably 0.1 to 10 mass %. When the amount is 0.1 mass % or more, sufficient feeling can be achieved, and when 40 mass % or less, feeling on use is favorable.

[Other Components]

The inventive emulsion addition-cured composition and cosmetics containing the same may be blended with various other components used in usual cosmetics. As the other components, for example, an oil agent other than the components (B) and (C) as (H), (I) a powder, (J) a surfactant other than the component (A), (K) a crosslinked organopolysiloxane, (L) a film former, and (M) other additives may be contained. One of these can be used or an appropriate combination of two or more thereof can be used. These components are appropriately selected for use depending on the kind of the cosmetic, and so on. The amount of these components to be blended can be a known amount which depends on the kind of the cosmetic, and so on.

(H): Oil Agents Other than Components (B) and (C)

One or more oil agents selected from oil agents (H) other than components (B) and (C) can be blended in the inventive cosmetic according to the object. An oil agent in any form of solid, semi-solid, or liquid can be used as long as it is used in usual cosmetics. For example, natural vegetable and animal fats and oils, semi-synthetic fats and oils, hydrocarbon oils, higher alcohols, ester oils, commonly used silicone oils, fluorinated oil agents, ultraviolet absorbers, and the like can be used. In a case where an oil agent is blended, the amount of the oil agent blended is not particularly limited, but is preferably 1 to 95 mass %, more preferably 1 to 30 mass % of the total cosmetic.

Silicone Oils

Examples of the silicone oils include low viscous to high viscous linear or branched organopolysiloxanes such as dimethyl polysiloxane, tristrimethylsiloxy methylsilane, caprylyl methicone, phenyl trimethicone, tetrakistrimethylsiloxysilane, methylphenylpolysiloxane, methylhexylpolysiloxane, methyl hydrogen polysiloxane, and dimethylsiloxane/methylphenylsiloxane copolymers; cyclic organopolysiloxanes such as octamethyl cyclotetrasiloxane, decamethyl cyclopentasiloxane, dodecamethyl cyclohexasiloxane, tetramethyl tetrahydrogen cyclotetrasiloxane, and tetramethyltetraphenyl cyclotetrasiloxane; silicone rubbers such as amino-modified organopolysiloxanes, pyrrolidone-modified organopolysiloxanes, pyrrolidone carboxylate-modified organopolysiloxanes, gum dimethyl polysiloxanes with high polymerization degree, gum amino-modified organopolysiloxanes, and gum dimethylsiloxane/methylphenylsiloxane copolymers; silicone gum and rubber cyclic organopolysiloxane solutions, higher alkoxy-modified silicone such as stearoxysilicone, higher fatty acid-modified silicones, alkyl-modified silicones, long chain alkyl-modified silicones, amino acid-modified silicones, fluorine-modified silicones, and the like.

Natural Vegetable and Animal Fats and Oils and Semi-Synthetic Fats and Oils

Examples of the natural animal and vegetable oils and fats and semi-synthetic oils and fats include avocado oil, linseed oil, almond oil, insect wax, perilla oil, olive oil, cacao butter, kapok wax, kaya oil, carnauba wax, liver oil, candelilla wax, purified candelilla wax, beef tallow, neats foot fat, beef bone fat, hardened beef tallow, apricot kernel oil, whale wax, hardened oil, wheat germ oil, sesame oil, rice germ oil, rice bran oil, sugarcane wax, *Camellia sasanqua* oil, safflower oil, shea butter, Chinese tung oil, cinnamon oil, jojoba wax, squalane, squalene, shellac wax, turtle oil, soybean oil, tea seed oil, camellia oil, evening primrose oil, corn oil, lard, rapeseed oil, Japanese tung oil, bran wax, germ oil, horse fat, persic oil, palm oil, palm kernel oil, castor oil, hardened castor oil, castor oil fatty acid methyl ester, sunflower oil, grape oil, bayberry wax, jojoba oil, macadamia nut oil, bees wax, mink oil, meadowfoam oil, cottonseed oil, cotton wax, Japan wax, Japan wax kernel oil, montan wax, coconut oil, hardened coconut oil, tri-coconut oil fatty acid glyceride, mutton tallow, peanut oil, lanolin, liquid lanolin, reduced lanolin, lanolin alcohol, hard lanolin, lanolin acetate, acetylated lanolin alcohol, lanolin fatty acid isopropyl, POE lanolin alcohol ether, POE lanolin alcohol acetate, lanolin fatty acid polyethylene glycol, POE hydrogenated lanolin alcohol ether, egg yolk oil, etc. Provided that POE means polyoxyethylene.

Hydrocarbon Oils

Examples of the hydrocarbon oils include a linear, branched, and further volatile hydrocarbon oils, etc., and specific examples include ozokerite, α-olefin oligomer, light isoparaffin, isododecane, isohexadecane, light liquid isoparaffin, squalane, synthetic squalane, vegetable squalane, squalene, ceresin, paraffin, paraffin wax, polyethylene wax, polyethylene•polypropylene wax, an (ethylene/propylene/styrene) copolymer, a (butylene/propylene/styrene) copolymer, liquid paraffin, liquid isoparaffin, pristane, polyisobutylene, hydrogenated polyisobutene, microcrystalline wax, vaseline, higher fatty acid, etc. Examples of the higher fatty acid include lauric acid, myristic acid, palmitic acid, stearic acid, behenic acid, undecylenic acid, oleic acid, linoleic acid, linolenic acid, arachidonic acid, eicosapentaenoic acid (EPA), docosahexaenoic acid (DHA), isostearic acid, 12-hydroxystearic acid, etc.

Higher Alcohols

Examples of the higher alcohols include lauryl alcohol, myristyl alcohol, palmityl alcohol, stearyl alcohol, behenyl alcohol, hexadecyl alcohol, oleyl alcohol, isostearyl alcohol, hexyldodecanol, octyldodecanol, cetostearyl alcohol, 2-decyltetradecynol, cholesterol, phytosterol, POE cholesterol ether, monostearyl glycerin ether (batyl alcohol), monooleyl glyceryl ether (selacyl alcohol), etc.

Ester Oils

Examples of the ester oils include diisobutyl adipate, 2-hexyldecyl adipate, di-2-heptylundecyl adipate, N-alkylglycol monoisostearate, isocetyl isostearate, trimethylolpropane triisostearate, ethylene glycol di-2-ethylhexanoate, cetyl 2-ethylhexanoate, trimethylolpropane tri-2-ethylhexanoate, pentaerythritol tetra-2-ethylhexanoate, cetyl octanoate, octyldodecyl gum ester, oleyl oleate, octyldodecyl oleate, decyl oleate, neopentyl glycol dioctanoate, neopentyl glycol dicaprate, triethyl citrate, 2-ethylhexyl succinate, amyl acetate, ethyl acetate, butyl acetate, isocetyl stearate, butyl stearate, diisopropyl sebacate, di-2-ethylhexyl sebacate, cetyl lactate, myristyl lactate, isononyl isononanate, isotridecyl isononanate, isopropyl palmitate, 2-ethylhexyl palmitate, 2-hexyldecyl palmitate, 2-heptylundecyl palmitate, cholesteryl 12-hydroxystearate, dipentaerythritol fatty acid ester, isopropyl myristate, octyldodecyl myristate, 2-hexyldecyl myristate, myristyl myristate, hexyldecyl dimethyloctanoate, ethyl laurate, hexyl laurate, N-lauroyl-L-glutamic acid-2-octyldodecyl ester, isopropyl lauroyl sarcosinate, diisostearyl malate, and glyceride oil, etc. Examples of the glyceride oil include acetoglyceryl, glyceryl triisooctanoate, glyceryl triisostearate, glyceryl triisopalmitate, glyceryl tribehenate, glyceryl monostearate, glyceryl di-2-heptylundecanoate, glyceryl trimyristate, diglyceryl isostearate/myristate, etc.

Fluorinated Oil Agents

Examples of the fluorinated oil agents include perfluoropolyether, perfluorodecalin, perfluorooctane, etc.

Ultraviolet Absorbers

Examples of the ultraviolet absorbers include a benzoic acid-based ultraviolet absorber such as para-aminobenzoic acid, etc., an anthranilic acid-based ultraviolet absorber such as methyl anthranilate, etc., a salicylic acid-based ultraviolet absorber such as methyl salicylate, octyl salicylate, trimethylcyclohexyl salicylate, etc., a cinnamic acid-based ultraviolet absorber such as octyl para-methoxycinnamate, etc., a benzophenone-based ultraviolet absorber such as 2,4-dihydroxybenzophenone, etc., an urocanic acid-based ultraviolet absorber such as ethyl urocanate, etc., a dibenzoylmethane-based ultraviolet absorber such as 4-t-butyl-4'-methoxydibenzoylmethane, etc., phenylbenzimidazole sulfonic acid, a triazine derivative, etc. The ultraviolet absorbers may contain an ultraviolet absorptive scattering agent. Examples of the ultraviolet absorptive scattering agent include powder which absorbs or scatters ultraviolet rays such as fine particulate titanium oxide, fine particulate iron-containing titanium oxide, fine particulate zinc oxide, fine particulate cerium oxide and a complex thereof, etc., and a dispersion in which these powders which absorb and scatter ultraviolet rays are dispersed in the oil agent in advance can also be used.

(I) Powder

As the powder, any of the materials can be used as long as it is used for the usual cosmetics, regardless of its shape (spherical, needle-like, plate-like, etc.) or particle size (fumed, fine particles, pigment grade, etc.), particulate structure (porous, nonporous, etc.). Examples include silicone spherical powder, inorganic powder, organic powder, surfactant metal salt powder, colored pigment, pearl pigment, metal powder pigment, tar pigment, natural pigment, etc.

Inorganic Powder

Specific examples of the inorganic powder include powders selected from titanium oxide, zirconium oxide, zinc oxide, cerium oxide, magnesium oxide, barium sulfate, calcium sulfate, magnesium sulfate, calcium carbonate, magnesium carbonate, talc, mica, kaolin, sericite, muscovite, synthetic mica, phlogopite, lepidolite, biotite, lithia mica, silicic acid, silicic anhydride, aluminum silicate, magnesium silicate, magnesium aluminum silicate, calcium silicate, barium silicate, strontium silicate, metal tungstate, hydroxyapatite, vermiculite, Higilite, bentonite, montmorillonite, hectorite, zeolite, ceramic powder, dibasic calcium phosphate, alumina, aluminum hydroxide, boron nitride, boron nitride, silica, etc.

Organic Powder

Examples of the organic powder include powders selected from polyamide powder, polyester powder, polyethylene powder, polypropylene powder, polystyrene powder, polyurethane, benzoguanamine powder, polymethylbenzoguanamine powder, tetrafluoroethylene powder, polymethyl methacrylate powder, cellulose, silk powder, Nylon powder, 12 Nylon, 6 Nylon, silicone powder, styrene•acrylic acid copolymer, divinylbenzene•styrene copolymer, vinyl resin, urea resin, phenol resin, fluorine resin, silicon resin, acrylic resin, melamine resin, epoxy resin, polycarbonate resin, microcrystalline fiber powder, starch powder, lauroyl lysine, etc.

Surfactant Metal Salt Powder

Examples of the surfactant metal salt powder (metallic soap) include powders selected from zinc stearate, aluminum stearate, calcium stearate, magnesium stearate, zinc myristate, magnesium myristate, zinc cetyl phosphate, calcium cetyl phosphate, zinc sodium cetyl phosphate, etc.

Colored Pigment

Examples of the colored pigment include powders selected from inorganic red pigments such as iron oxide, iron hydroxide and iron titanate, inorganic brown pigments such as γ-iron oxide, etc., inorganic yellow pigments such as yellow iron oxide, loess, etc., inorganic black pigments such as black iron oxide, carbon black, etc., inorganic violet pigments such as manganese violet, cobalt violet, etc., inorganic green pigments such as chromium hydroxide, chromium oxide, cobalt oxide, cobalt titanate, etc., inorganic blue pigments such as prussian blue, ultramarine blue, etc., those obtained by laking tar pigments, those obtained by laking natural dyes, synthetic resin powders obtained by combining these powders, etc.

Pearl Pigment

Examples of the pearl pigment include powders selected from titanium oxide-coated mica, titanium oxide-coated mica, bismuth oxychloride, titanium oxide-coated bismuth oxychloride, titanium oxide-coated talc, fish scale foil, titanium oxide-coated colored mica, etc.

Metal Powder Pigment

Examples of the metal powder pigment include powders selected from aluminum powder, copper powder, stainless powder, etc.

Tar Pigment

Examples of the tar pigment include powders selected from Red No. 3, Red No. 104, Red No. 106, Red No. 201, Red No. 202, Red No. 204, Red No. 205, Red No. 220, Red No. 226, Red No. 227, Red No. 228, Red No. 230, Red No. 401, Red No. 505, Yellow No. 4, Yellow No. 5, Yellow No. 202, Yellow No. 203, Yellow No. 204, Yellow No. 401, Blue No. 1, Blue No. 2, Blue No. 201, Blue No. 404, Green No. 3, Green No. 201, Green No. 204, Green No. 205, Orange No. 201, Orange No. 203, Orange No. 204, Orange No. 206, Orange No. 207, etc.

Natural Pigment

Examples of the natural pigment include powders selected from carminic acid, laccaic acid, carthamin, brazilin, crocin, etc.

As these powders, those in which powders are compounded, or those treated with general oil, silicone oil, a fluorine compound, a surfactant, etc. may also be used. One or more of those treated with a hydrolyzable silyl group or an alkyl group having a hydrogen atom directly bonded to a silicon atom, a linear and/or branched organopolysiloxane having a hydrolyzable silyl group or a hydrogen atom directly bonded to a silicon atom, a linear and/or branched organopolysiloxane having a hydrolyzable silyl group or a hydrogen atom directly bonded to a silicon atom and being co-modified by a long chain alkyl, a linear and/or branched organopolysiloxane having a hydrolyzable silyl group or a hydrogen atom directly bonded to a silicon atom and being co-modified by polyoxyalkylene, an acrylic-silicone-based copolymer having a hydrolyzable silyl group or a hydrogen atom directly bonded to a silicon atom, etc., may also be used depending on necessity. A silicone treatment agent is more preferable, and examples thereof include silanes or silylation agents such as caprylylsilane (AES-3083 manufactured by Shin-Etsu Chemical Co., Ltd.) or trimethoxysilyl dimethicone, etc., silicone oils such as dimethyl silicone (KF-96A series manufactured by Shin-Etsu Chemical Co., Ltd.), methyl hydrogen polysiloxane (KF-99P, KF-9901, etc. manufactured by Shin-Etsu Chemical Co., Ltd.), silicone-branched silicone treatment agent (KF-9908, KF-9909, etc. manufactured by Shin-Etsu Chemical Co., Ltd.) etc., and acrylic silicone (KP-574 and KP-541 manufactured by Shin-Etsu Chemical Co., Ltd.), etc. Specific examples of pigments with a surface treatment include the KTP-09 series manufactured by Shin-Etsu Chemical Co., Ltd., in particular, KTP-09W, 09R, 09Y, 09B, etc. Specific examples of dispersions containing hydrophobized fine-particle titanium oxide or hydrophobized fine-particle zinc oxide include SPD-T5, T6, T7, T5L, Z5, Z6, Z5L, etc. manufactured by Shin-Etsu Chemical Co., Ltd.

Silicone Spherical Powder

Examples of the silicone spherical powder include crosslinked silicone powders (i.e., what is called silicone rubber powders of organopolysiloxanes having such a structure that repeating chains of diorganosiloxane units are crosslinked), silicone resin particles (polyorganosilsesquioxane resin particles having a three-dimensional network structure), silicone resin-coated silicone rubber powders, etc.

Specific examples of the crosslinked silicone powders and silicone resin particles include those known under names such as (dimethicone/vinyl dimethicone) crosspolymer, polymethylsilsesquioxane, etc. These are commercially available as powder or swollen material containing silicone oil under product names such as, for example, KMP-598, 590, 591, and KSG-016F (all of which are manufactured by Shin-Etsu Chemical Co., Ltd.). These powders provide cosmetics with smoothness by a rolling effect peculiar to spherical powders, and improve feeling on use. One of these can be used or a combination of two or more thereof can be used.

Silicone resin-coated silicone rubber powders are particularly favorable since silicone resin-coated silicone rubber powders have the effect of improving feeling, for example, preventing stickiness, etc. and the effect of correcting unevenness of wrinkles, pores, etc. and the like. As specific examples of the silicone resin-coated silicone rubber powders, those such as (vinyl dimethicone/methicone silsesquioxane) crosspolymer, (diphenyl dimethicone/vinyldiphenyl dimethicone/silsesquioxane) crosspolymer, polysilicone-22, polysilicone-1 crosspolymers, etc. can be used, which are defined in Cosmetic-Info.jp. These are commercially available under product names such as KSP-100, 101, 102, 105, 300, 411, and 441 (all of which are manufactured by Shin-Etsu Chemical Co., Ltd.). One of these powders can be used or a combination of two or more thereof can be used.

When a powder is blended, the amount of the powder blended is not particularly limited, but 0.1 to 90 mass % of the total cosmetic is preferably blended, further preferably 1 to 35 mass %.

(J) Surfactant Other than Component (A)

The surfactant other than the component (A) includes nonionic, cationic and amphoteric surfactants, but is not particularly limited, and any of these can be used as long as it is used in usual cosmetics. One of these can be used or an appropriate combination of two or more thereof can be used.

Among these surfactants, preferable are crosslinked polyether-modified silicones, crosslinked polyglycerin-modified silicones, linear or branched polyoxyethylene-modified organopolysiloxanes, linear or branched polyoxyethylene-polyoxypropylene-modified organopolysiloxanes, linear or branched polyoxyethylene/alkyl-co-modified organopolysiloxanes, linear or branched polyoxyethylene-polyoxypropylene/alkyl-co-modified organopolysiloxanes, linear or branched polyglycerin-modified organopolysiloxanes, and linear or branched polyglycerin/alkyl-co-modified organopolysiloxanes, in view of compatibility with oil agents containing the component (A).

In these surfactants, the content of hydrophilic polyoxyethylene groups, polyoxyethylene-polyoxypropylene groups, or polyglycerin residues is preferably 10 to 70% in the molecule. Specific examples of such surfactants include KSG-210, 240, 310, 320, 330, 340, 320Z, 350Z, 710, 810, 820, 830, 840, 820Z, 850Z, KF-6011, 6013, 6017, 6043, 6028, 6038, 6048, 6100, 6104, 6105, and 6106, manufactured by Shin-Etsu Chemical Co., Ltd., and the like.

When the component (J) is blended, the blended amount is preferably 0.01 to 15 mass % in the cosmetic.

(K) Crosslinked Organopolysiloxane

The crosslinked organopolysiloxane is not particularly limited as long as it is used in usual cosmetic products. One of the crosslinked organopolysiloxane can be used or an appropriate combination of two or more thereof can be used.

Unlike the silicone spherical powders described in (I) above, the crosslinked organopolysiloxane does not have a spherical shape.

In addition, unlike the surfactant (J) other than the component (A), the component (K) is preferably a compound having no polyether- or polyglycerin structure in the molecular structure, and is an elastomer having structural viscosity by swelling with the oil agent. Specific examples of the crosslinked organopolysiloxane include (dimethicone/vinyl dimethicone) crosspolymers, (dimethicone/phenylvinyl dimethicone) crosspolymers, (vinyl dimethicone/lauryl dimethicone) crosspolymers, (lauryl polydimethylsiloxyethyl dimethicone/bis-vinyl dimethicone) crosspolymers, and the like, which are defined in Cosmetic-Info.jp. These are commercially available as swollen materials containing oil which is liquid at room temperature. Specific examples thereof include KSG-15, 1510, 16, 1610, 18A, 19, 41A, 42A, 43, 44, 042Z, 045Z, and 048Z, which are manufactured by Shin-Etsu Chemical Co., Ltd., and the like.

When the component (K) is blended, the blended amount is preferably 0.01 to 30 mass % in the cosmetic as solid contents.

(L) Film Former

As the film former, existing film formers can be used in combination. The existing film formers are not particularly limited as long as the raw material can be blended in usual cosmetics. Specifically, used as the film former are: latexes such as polyvinyl alcohol, polyvinylpyrrolidone, polyvinyl acetate, and polyalkyl acrylate; cellulose derivatives such as dextrin, alkyl cellulose, and nitrocellulose; siliconized polysaccharides such as pullulan tri(trimethylsiloxy)silylpropylcarbamate; acrylic-silicone graft copolymers such as (alkyl acrylate/dimethicone) copolymers; silicone resins such as trimethylsiloxysilicate; silicone-based resins such as silicone-modified polynorbornene and fluorine-modified silicone resins; fluorinated resins, aromatic hydrocarbon resins, polymer emulsion resins, terpene-based resins, polybutene, polyisoprene, alkyd resins, polyvinylpyrrolidone-modified polymers, rosin-modified resins, polyurethanes, and the like.

Among these, silicone-based film formers are particularly preferable. Above all, it is possible to use, without limitation to, pullulan tri(trimethylsiloxy)silylpropyl carbamate (commercially available products, dissolved in a solvent, include TSPL-30-D5 and ID manufactured by Shin-Etsu Chemical Co., Ltd.), (alkyl acrylate/dimethicone) copolymers (commercially available products, dissolved in a solvent, include KP-543, 545, 549, 550, and 545L manufactured by Shin-Etsu Chemical Co., Ltd., and the like), trimethylsiloxysilicate (commercially available products, dissolved in a solvent, include KF-7312J and X-21-5250 manufactured by Shin-Etsu Chemical Co., Ltd., and the like), silicone-modified polynorbornene (commercially available products, dissolved in a solvent, include NBN-30-ID manufactured by Shin-Etsu Chemical Co., Ltd., and the like), an organosiloxane graft polyvinyl alcohol polymer, and the like.

When the component (L) is blended, the blended amount is preferably 0.1 to 20 mass % in the cosmetic.

(M) Other Additives

Examples of the other additives include an oil-soluble gelling agent, water-soluble thickening agent, antiperspirant, preservative and antimicrobial, perfume, salt, antioxidant, pH adjuster, chelator, refrigerant, anti-inflammatory agent, skincare component (such as whitening agent, cell activator, rough skin improver, blood circulation promoter, skin astringent, antiseborrheic agent), vitamin, amino acid, nucleic acid, hormone, inclusion compound, and the like. One of these components (M) can be used or an appropriate combination of two or more thereof can be used. When the component (M) is blended, the blended amount is preferably 0.1 to 20 mass % in the cosmetic.

Oil-Soluble Gelling Agent

Examples of the oil-soluble gelling agent include metal soaps such as aluminum stearate, magnesium stearate, and zinc myristate; amino acid derivatives such as N-lauroyl-L-glutamic acid and $\alpha,\gamma$-di-n-butylamine; dextrin fatty acid esters such as dextrin palmitic acid ester, dextrin stearic acid ester, and dextrin 2-ethylhexanoic acid/palmitic acid ester; sucrose fatty acid esters such as sucrose palmitic acid ester and sucrose stearic acid ester; fructo-oligosaccharide fatty acid esters such as fructo-oligosaccharide stearic acid ester and fructo-oligosaccharide 2-ethylhexanoic acid ester; benzylidene derivatives of sorbitol such as monobenzylidene sorbitol and dibenzylidene sorbitol; organic-modified clay minerals of disteardimonium hectorite, stearalkonium hectorite, and hectorite; and the like.

Water-Soluble Thickening Agent

Examples of the water-soluble thickening agent include plant polymers such as an Arabia gum, tragacanth, galactan, a carob gum, a guar gum, a karaya gum, carrageenan, pectin, agar, quince seed (marmelo), starch (rice, corn, potato, wheat, and so on), an algae colloid, a trant gum, and a locust bean gum; microbial polymers such as a xanthan gum, dextran, succinoglucan, and pullulan; animal polymers such as collagen, casein, albumin, and gelatin; starch polymers such as carboxymethyl starch and methyl hydroxypropyl starch; cellulose polymers such as methyl cellulose, ethyl cellulose, methyl hydroxypropyl cellulose, carboxymethyl cellulose, hydroxymethyl cellulose, hydroxypropyl cellulose, nitrocellulose, sodium cellulose sulfate, sodium carboxymethyl cellulose, crystalline cellulose, cationized cellulose, and cellulose powder; alginic acid polymers such as sodium alginate and propylene glycol alginate ester; vinyl polymers such as polyvinyl methyl ether and carboxy vinyl polymer; a polyoxyethylene polymer; polyoxyethylene polyoxypropylene copolymer polymers; acryl polymers such as sodium polyacrylate, polyethyl acrylate, polyacrylamide, and an acryloyldimethyl taurate salt copolymer; other synthetic water-soluble polymers such as polyethyleneimine and a cationic polymer; inorganic water-soluble polymers such as a bentonite, aluminum magnesium silicate, montmorillonite, beidellite, nontronite, saponite, hectorite, and anhydrous silicic acid; and the like.

In particular, one or a combination of two or more water-soluble thickening agents selected from plant polymers, microbial polymers, animal polymers, starch polymers, cellulose polymers, alginic acid polymers, polyoxyethylene polyoxypropylene copolymer polymers, acryl polymers, and inorganic water-soluble polymers are preferably used.

Antiperspirant

Examples of the antiperspirant include aluminum hydroxyhalides such as chlorohydroxy aluminum and aluminum chlorohydroxy allantoinate; aluminum halides such as aluminum chloride; aluminum allantoinate, tannic acid, persimmon tannin, potassium aluminum sulfate, zinc oxide, zinc para-phenolsulfonate, burnt alum, aluminum zirconium tetrachlorohydrate, aluminum zirconium trichlorohydrex glycine, and the like. In particular, as components that exhibit a high effect, aluminum hydroxyhalide, aluminum halide, and a complex or mixture thereof with zirconyl oxyhalide, zirconyl hydroxyhalide (for example, aluminum zirconium tetrachlorohydrate and aluminum zirconium trichlorohydrex glycine), and the like are preferable.

Preservative and Antimicrobial

Examples of the preservative and antimicrobial include para-oxybenzoate alkyl ester, benzoic acid, sodium benzoate, sorbic acid, potassium sorbate, phenoxy ethanol, imidazolidinyl urea, salicylic acid, isopropylmethylphenol, carbolic acid, p-chloro-m-cresol, hexachlorophene, benzalkonium chloride, chlorhexidine chloride, trichlorocarbanilide, iodopropynyl butylcarbamate, polylysine, photosensitizers, silver, plant extracts, and the like.

Perfume

Examples of the perfume include natural perfumes and synthetic perfumes. Examples of the natural perfume include vegetable perfume separated from flowers, leaves, wood, pericarp, etc.; and animal perfume such as musk, civet, etc. Examples of the synthetic perfume include hydrocarbons such as monoterpene, etc.; alcohols such as an aliphatic alcohol, an aromatic alcohol, etc.; aldehydes such as terpene aldehyde, aromatic aldehyde, etc.; ketones such as an alicyclic ketone, etc.; esters such as a terpene-based ester, etc.; lactones; phenols; oxides; nitrogen-containing compounds; acetals; etc.

Salt

Examples of the salt include an inorganic salt, an organic acid salt, an amine salt, and an amino acid salt. Examples of the inorganic salt include a sodium salt, a potassium salt, a magnesium salt, a calcium salt, an aluminum salt, a zirconium salt, a zinc salt, etc., of an inorganic acid such as hydrochloric acid, sulfuric acid, carbonic acid, nitric acid, etc. Examples of the organic acid salt include salts of an organic acid such as acetic acid, dehydroacetic acid, citric acid, malic acid, succinic acid, ascorbic acid, stearic acid, etc. Examples of the amine salt and the amino acid salt include a salt of an amine such as triethanolamine, etc., and a salt of an amino acid such as glutamic acid, etc. In addition, as others, a salt of hyaluronic acid, chondroitin sulfuric acid, etc., and further an acid-alkali neutralizing salt used in preparation prescription can be also used.

Antioxidant

Examples of the antioxidant include, but are not particularly limited to, carotenoid, ascorbic acid and a salt thereof, ascorbyl stearate, tocopherol acetate, tocopherol, p-t-butylphenol, butylhydroxyanisol, dibutylhydroxytoluene, phytic acid, ferulic acid, thiotaurine, hypotaurine, sulfite, erythorbic acid and a salt thereof, chlorogenic acid, epicatechin, epigallocatechin, epigallocatechin gallate, apigenin, campherol, myricetin, quercetin, and the like.

pH Adjuster Examples of the pH adjuster include lactic acid, citric acid, glycolic acid, succinic acid, tartaric acid, dl-malic acid, potassium carbonate, sodium bicarbonate, ammonium bicarbonate, and the like.

Chelator

Examples of the chelator include alanine, sodium edetate, sodium polyphosphate, sodium metaphosphate, phosphoric acid, and the like.

Refrigerant

Examples of the refrigerant include L-menthol, camphor, menthyl lactate, and the like.

Anti-Inflammatory Agent

Examples of the anti-inflammatory agent include allantoin, glycyrrhizinic acid and a salt thereof, glycyrrhetinic acid and stearyl glycyrrhetinate, tranexamic acid, azulene, and the like.

Skincare Component

Examples of the skincare component include a skin-brightening agent such as a placenta extract, arbutin, gluta-thione, and strawberry geranium extract; a cell activator such as royal jelly, a photosensitizer, a cholesterol derivative, and a calf blood extract; a rough skin-improving agent, a blood circulation promoter such as vanillylamide nonylate, benzyl nicotinate, β-butoxyethyl nicotinate, capsaicin, zingerone, cantharides tincture, ichthammol, caffeine, tannic acid, α-borneol, tocopherol nicotinate, inositol hexanicotinate, cyclandelate, cinnarizine, tolazoline, acetylcholine, verapamil, cepharanthine, and γ-orizanol; a skin astringent, an antiseborrheic agent such as sulfur and thianthrol, and the like.

Vitamin

Examples of the vitamin include vitamin A such as vitamin A oil, retinol, retinol acetate, and retinol palmitate; vitamin B including vitamin $B_2$ such as riboflavin, riboflavin butyrate, and flavin adenine nucleotide, vitamin $B_6$ such as pyridoxine hydrochloride, pyridoxine dioctanoate, and pyridoxine tripalmitate, vitamin $B_{12}$ and a derivative thereof, and vitamin $B_{15}$ and a derivative thereof; vitamin C such as L-ascorbic acid, L-ascorbic acid dipalmitate, sodium L-ascorbic acid-2-sulfate, and dipotassium L-ascorbic acid diphosphate; vitamin D such as ergocalciferol and cholecalciferol; vitamin E such as α-tocopherol, β-tocopherol, γ-tocopherol, dl-α-tocopherol acetate, dl-α-tocopherol nicotinate, and dl-α-tocopherol succinate; nicotinic acids such as nicotinic acid, benzyl nicotinate, and amide nicotinate; pantothenic acids such as vitamin H, vitamin P, calcium pantothenate, D-pantothenyl alcohol, pantothenyl ethyl ether, and acetyl pantothenyl ethyl ether; biotin, and the like.

Amino Acid

Examples of the amino acid include glycine, valine, leucine, isoleucine, serine, threonine, phenylalanine, arginine, lysine, aspartic acid, glutamic acid, cystine, cysteine, methionine, tryptophan, and the like.

Nucleic Acid

Examples of the nucleic acid include deoxyribonucleic acid, and the like.

Hormone

Examples of the hormone include estradiol, ethenyl estradiol, and the like.

Inclusion Compound

Examples of the inclusion compound include cyclodextrin, and the like.

The cosmetic per se of the present invention is not particularly limited. For example, the present invention is applicable to various products such as beauty essence, milky lotion, cream, hair care product, foundation, makeup base, sunscreen, concealer, cheek color, lipstick, gloss, balm, mascara, eye shadow, eyeliner, body make-up, deodorant, and manicure product. Among these, make-up cosmetics such as foundation, lipstick, mascara, eyeliner, etc. and cosmetics provided with a sunscreening effect are particularly preferable.

The physical form of the inventive cosmetic can be selected from various physical forms such as liquid, cream, solid, paste, gel, mousse, souffle, clay, powder, and stick forms.

EXAMPLE

Hereinafter, the present invention will be described specifically with reference to Examples and Comparative Examples. However, the present invention is not limited thereto.

Examples 1 to 25 and Preparation Examples 1 to 3

In a 200-mL glass beaker were charged SFNa (KANEKA Surfactin, Kaneka Corporation) as (A) an anionic surfactant, organopolysiloxanes (1) to (3) shown in the following formulae as (B) an organopolysiloxane having at least two hydrosilyl groups in one molecule thereof, organopolysiloxanes (4) to (6) shown in the following formulae as (C) an organopolysiloxane having at least two olefinic unsaturated groups in one molecule thereof, glycerin, being a polyhydric alcohol, as (D) a monohydric or polyhydric alcohol, a decamethylcyclopentasiloxane (KF-995) or a linear organopolysiloxane (KF-96A-6cs) (a silicone oil having a viscosity of 20 mm$^2$/s or less at 25° C. not containing hydrosilyl groups or olefinic unsaturated groups) as (H) an oil agent other than the components (B) and (C), isododecane as a volatile hydrocarbon oil, and 2-ethylhexyl palmitate as an ester oil by the composition shown in Tables 2 and 3. The mixture was stirred and dissolved at room temperature by using a disper, and then (E) water was dropped thereto under room temperature to prepare a transparent or translucent microemulsion composition α (Examples 1 to 11, Preparation Examples 1 to 3). After that, (E) water was further added under room temperature to prepare a milky-white emulsion composition (Examples 1 to 11). Furthermore, as shown in Tables 4 and 5, water was further added to the emulsions obtained in Examples 1 to 11 and Preparation Examples 1 to 3 to prepare emulsion compositions (Examples 12 to 25). In Tables 2 to 5, the blended amounts are shown by mass %. In addition, the kinematic viscosity, the vinyl group content, and the hydrosilyl group content of the organopolysiloxanes (1) to (6) are shown in Table 1.

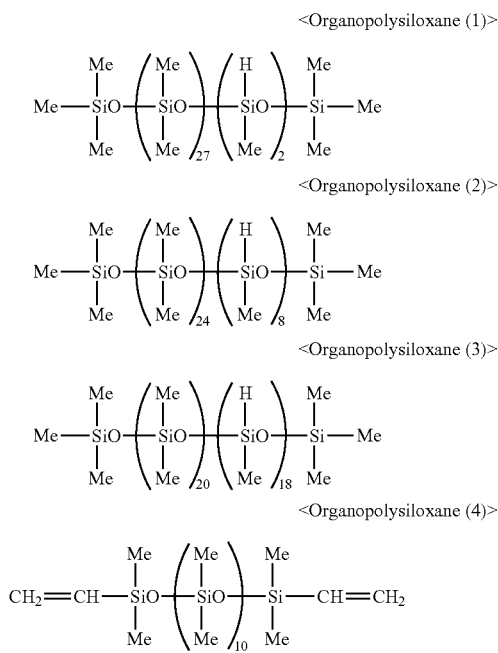

<Organopolysiloxane (1)>
<Organopolysiloxane (2)>
<Organopolysiloxane (3)>
<Organopolysiloxane (4)>

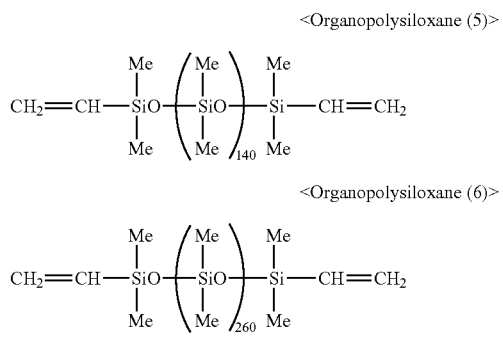

<Organopolysiloxane (5)>
<Organopolysiloxane (6)>

TABLE 1

|  | Kinematic viscosity mm$^2$/s | Vinyl group content mol/100 g | Hydrosilyl group content mol/100 g |
| --- | --- | --- | --- |
| Organopolysiloxane (1) | 31.9 | — | 0.095 |
| Organopolysiloxane (2) | 26.6 | — | 0.44 |
| Organopolysiloxane (3) | 16.9 | — | 0.75 |
| Organopolysiloxane (4) | 9.2 | 0.20 | — |
| Organopolysiloxane (5) | 385 | 0.018 | — |
| Organopolysiloxane (6) | 567 | 0.015 | — |

The water dispersibility was investigated by adding one drop of the emulsion prepared in Preparation Examples 1 to 3 and Examples 1 to 11 to 10 ml of water (water dispersibility test). Similarly, the oil dispersibility was investigated by adding one drop of the emulsion to 10 ml of a D5 (decamethylcyclopentasiloxane) solution (oil dispersibility test). Tables 2 to 5 show the results along with the evaluation of the appearance of the emulsion at 25° C.

A pigment solubility test was conducted on the obtained emulsions (Preparation Examples 1 to 3 and Examples 1 to 25). As test methods, the water solubility was investigated by adding an aqueous water-soluble pigment (Blue #1) solution (concentration: 0.1 mass %) to the obtained emulsion. Meanwhile, the oil solubility was investigated in the same manner as above by adding an oil-soluble pigment (β-carotene) solution in decamethylcyclopentasiloxane (concentration: 1.0 mass %) to the obtained emulsion.

The particle size of the obtained emulsion composition (Examples 12 to 25) was measured. The values shown are the values of the median diameters measured by a laser diffraction scattering type particle size analyzer LA-960 (manufactured by HORIBA, Ltd.).

TABLE 2

|  |  | Preparation Example 1 | Preparation Example 2 | Preparation Example 3 | Example 1 | Example 2 | Example 3 | Example 4 | Example 5 | Example 6 | Example 7 |
| --- | --- | --- | --- | --- | --- | --- | --- | --- | --- | --- | --- |
| Formulated composition (mass %) | SFNa | 1.0 | 1.0 | 1.0 | 0.8 | 4.2 | 0.8 | 4.2 | 0.5 | 3.3 | 2.1 |
|  | Glycerin | 21.0 | 21.0 | 21.0 | 17.5 | 27.5 | 16.8 | 27.5 | 10.8 | 23.3 | 21.4 |
|  | Organopolysiloxane (1) | 9.7 |  |  |  |  |  |  |  | 6.5 |  |

TABLE 2-continued

| | | Preparation Example 1 | Preparation Example 2 | Preparation Example 3 | Example 1 | Example 2 | Example 3 | Example 4 | Example 5 | Example 6 | Example 7 |
|---|---|---|---|---|---|---|---|---|---|---|---|
| Organopolysiloxane (2) | | | 2.3 | | 1.9 | 1.4 | 17.0 | 13.1 | 20.2 | | |
| Organopolysiloxane (3) | | | | 1.4 | | | | | | | 1.0 |
| Organopolysiloxane (4) | | | | | | | 31.8 | 24.4 | 37.7 | | |
| Organopolysiloxane (5) | | 51.3 | | | | | | | | 34.2 | |
| Organopolysiloxane (6) | | | 58.7 | 57.6 | 48.9 | 36.1 | | | | | 41.1 |
| Water | | 17.0 | 17.0 | 19.0 | 30.9 | 30.8 | 33.6 | 30.8 | 30.8 | 32.7 | 34.4 |
| Total | | 100 | 100 | 100 | 100 | 100 | 100 | 100 | 100 | 100 | 100 |
| H/Vi | | 1.1 | 1.1 | 1.1 | 1.1 | 1.1 | 1.1 | 1.1 | 1.1 | 1.1 | 1.1 |
| Appearance of emulsion composition | | Colorless, transparent | Colorless, transparent | Translucent | Milky-white | Milky-white | Milky-white | Milky-white | Milky-white | Milky-white | Milky-white |
| Pigment solubility test | Water solubility | Homogeneously dissolved | Homogeneously dissolved | Homogeneously dissolved | Homogeneously dissolved | Homogeneously dissolved | Homogeneously dissolved | Homogeneously dissolved | Homogeneously dissolved | Homogeneously dissolved | Homogeneously dissolved |
| | Oil solubility | Homogeneously dissolved | Homogeneously dissolved | Homogeneously dissolved | Insoluble | Insoluble | Insoluble | Insoluble | Insoluble | Insoluble | Insoluble |
| Water dispersibility | | Homogeneously dispersed | Homogeneously dispersed | Homogeneously dispersed | Homogeneously dispersed | Homogeneously dispersed | Homogeneously dispersed | Homogeneously dispersed | Homogeneously dispersed | Homogeneously dispersed | Homogeneously dispersed |
| Oil dispersibility | | Separated | Separated | Separated | Separated | Separated | Separated | Separated | Separated | Separated | Separated |

TABLE 3

| | | Example 8 | Example 9 | Example 10 | Example 11 |
|---|---|---|---|---|---|
| Formulated composition (mass %) | SFNa | 0.7 | 0.7 | 0.7 | 0.7 |
| | Glycerin | 15.0 | 15.0 | 15.0 | 15.0 |
| | Organopolysiloxane (2) | 15.2 | 15.2 | 15.2 | 15.2 |
| | Organopolysiloxane (4) | 28.4 | 28.4 | 28.4 | 28.4 |
| | KF-995 | 10.7 | | | |
| | KF-96A-6cs | | 10.7 | | |
| | Isododecane | | | 10.7 | |
| | 2-ethylhexyl palmitate | | | | 10.7 |
| | Water | 30 | 30 | 30 | 30 |
| Total | | 100 | 100 | 100 | 100 |
| H/Vi | | 1.1 | 1.1 | 1.1 | 1.1 |
| Appearance of emulsion composition | | Milky-white | Milky-white | Milky-white | Milky-white |
| Pigment solubility test | Water solubility | Homogeneously dissolved | Homogeneously dissolved | Homogeneously dissolved | Homogeneously dissolved |
| | Oil solubility | Insoluble | Insoluble | Insoluble | Insoluble |
| Water dispersibility | | Homogeneously dispersed | Homogeneously dispersed | Homogeneously dispersed | Homogeneously dispersed |
| Oil dispersibility | | Separated | Separated | Separated | Separated |

As shown in the Tables 2 and 3, a microemulsion composition α having a transparent or translucent appearance at 25° C. was obtained in Preparation Examples 1 to 3. In Examples 1 to 11, an emulsion having a milky-white appearance at 25° C. was obtained. When these emulsions (Preparation Examples 1 to 3 and Examples 1 to 11) were respectively dropped into water, every emulsion was homogeneously dispersed. Thus, dispersibility in water was confirmed. On the other hand, when the emulsions were respectively dropped into oil, none of the emulsions dispersed in the oil, and each was separated. In this manner, it was shown that the produced emulsions (Preparation Examples 1 to 3 and Examples 1 to 11) had excellent water dispersibility.

In the pigment solubility test, the microemulsion compositions α having the transparent or translucent appearance at 25° C. shown in Preparation Examples 1 to 3 homogeneously dissolved both the water-soluble pigment and the oil-soluble pigment. Thus, the microemulsion compositions α were confirmed to have a bicontinuous structure. Meanwhile, the emulsions having the milky-white appearance at 25° C. shown in Examples 1 to 11 were homogeneously dissolved in the water-soluble pigment and were insoluble in the oil-soluble pigment. Thus, the emulsions were shown to be water-dispersion emulsions.

TABLE 4

| | | Example 12 | Example 13 | Example 14 | Example 15 | Example 16 | Example 17 | Example 18 | Example 19 | Example 20 | Example 21 |
|---|---|---|---|---|---|---|---|---|---|---|---|
| Formulated composition (mass %) | Preparation Example 1 | 50 | | | | | | | | | |
| | Preparation Example 2 | | 25 | | | | | | | | |
| | Preparation Example 3 | | | 25 | | | | | | | |
| | Example 1 | | | | 50 | | | | | | |
| | Example 2 | | | | | 100 | | | | | |
| | Example 3 | | | | | | 30 | | | | |
| | Example 4 | | | | | | | 25 | | | |
| | Example 5 | | | | | | | | 50 | | |
| | Example 6 | | | | | | | | | 100 | |
| | Example 7 | | | | | | | | | | 75 |
| | Water | 50 | 75 | 75 | 50 | — | 70 | 75 | 50 | — | 25 |
| Total | | 100 | 100 | 100 | 100 | 100 | 100 | 100 | 100 | 100 | 100 |
| Appearance of emulsion composition | | Milky-white | Milky-white | Milky-white | Milky-white | Milky-white | Milky-white | Milky-white | Milky-white | Milky-white | Milky-white |
| Pigment solubility test | Water solubility | Homogeneously dissolved | Homogeneously dissolved | Homogeneously dissolved | Homogeneously dissolved | Homogeneously dissolved | Homogeneously dissolved | Homogeneously dissolved | Homogeneously dissolved | Homogeneously dissolved | Homogeneously dissolved |
| | Oil solubility | Insoluble | Insoluble | Insoluble | Insoluble | Insoluble | Insoluble | Insoluble | Insoluble | Insoluble | Insoluble |
| Average particle size/μm | | 1.0 | 1.1 | 1.0 | 0.8 | 0.4 | 1.0 | 0.3 | 1.2 | 0.3 | 0.7 |

TABLE 5

| | | Example 22 | Example 23 | Example 24 | Example 25 |
|---|---|---|---|---|---|
| Formulated composition (mass %) | Emulsion composition of Example 8 | 25 | | | |
| | Emulsion composition of Example 9 | | 25 | | |
| | Emulsion composition of Example 10 | | | 25 | |
| | Emulsion composition of Example 11 | | | | 25 |
| | Water | 75 | 75 | 75 | 75 |
| Total | | 100 | 100 | 100 | 100 |
| Appearance of emulsion composition | | Milky-white | Milky-white | Milky-white | Milky-white |
| Pigment test | Water solubility | Homogeneously dissolved | Homogeneously dissolved | Homogeneously dissolved | Homogeneously dissolved |
| | Oil solubility | Insoluble | Insoluble | Insoluble | Insoluble |
| Average particle size/μm | | 1.0 | 1.1 | 1.0 | 1.2 |

As shown in the Tables 4 and 5, no additional water was added in Examples 16 and 20, and in Examples 12 to 15, 17 to 19, and 21 to 25, the compositions were mixed with additional water by the shown formulation composition. An emulsion having a milky-white appearance at 25° C. was obtained in each of Examples 12 to 25. In Examples 12 to 14, the appearance of the emulsion changed from a transparent or translucent state to a milky-white state by adding the additional water. Thus, it can be assumed that a phase transition from a bicontinuous structure to a water-dispersion emulsion occurred. In addition, every emulsion dispersed homogeneously when the emulsion was dropped into water. Accordingly, dispersibility in water was confirmed. On the other hand, when the emulsion was dropped into oil, none of the emulsions dispersed in oil, and all were separated. From the above, it was shown that the produced emulsion compositions had excellent water dispersibility.

Each of the obtained emulsion compositions had an average particle size of 2.0 μm or less. It can be observed from this that the emulsion particles in the water-dispersion emulsions produced by the present method were comparatively small.

Examples 26 to 30

While maintaining a 200-mL glass beaker containing 100 g of an emulsion composition of Examples 12, 15 to 17, and 21 having a milky-white appearance obtained above at 20 to 25° C. on a stirring apparatus, a mixture of 0.1 g (5 ppm of platinum relative to the total amount of the emulsion composition) of a solution of a chloroplatinic acid-vinylsiloxane complex in toluene (platinum concentration: 0.5 wt %) and 0.1 g of a polyoxyethylene lauryl ether (added number of moles of ethylene oxide=9 mol) was added while stirring, and the resultant was stirred for 12 hours within the same temperature range as above. Thus, an addition-curing reaction of the component (B) organopolysiloxane having hydrosilyl groups and the component (C) organopolysiloxane having vinyl groups was performed to produce an emulsion addition-cured composition (Table 6) Progression of the reaction was confirmed by NMR measurement, since the peak attributable to vinyl groups had disappeared in each case. 100 g of the obtained emulsion addition-cured composition was added to 500 g of ethanol while stirring. The precipitated oil-based component alone was sampled by filtration and dried for 3 hours in an oven at 105° C. When the physical form of the oil-based component obtained by drying was solid, the shape of the oil-based component was observed with a scanning electron microscope. Table 6 shows the results of the evaluation of the appearance of the emulsion composition before the reaction and the addition-cured material thereof at 25° C., particle size measurement, the physical form of the precipitated oil-based component, and the shape of the solid content observed with an electron microscope.

was gum with the combination in which crosslinking density was low, and solid with the combination in which crosslinking density was high. When the obtained solid component was observed with an electron microscope, each had a shape of spherical particles.

(Performance Evaluation)

5 g of the emulsion compositions of Examples 12, 15 to 17, and 20 and the emulsion addition-cured compositions of Examples 26 to 30 were respectively dispersed in 95 ml of water to prepare an aqueous dispersion thereof. About 0.02 g of the prepared aqueous dispersion was dropped on the back of the hand by using a dropper, and spread with the finger to a size of about 2 cm in diameter. After air-drying for 3 minutes, this was rubbed hard with the finger. The aqueous dispersion of the emulsion composition in Examples 12, 15 to 17, and 20 had a stickiness originating from surfactant, but in the emulsion addition-cured composition in Examples 26 to 30, stickiness was reduced. In particular, in Examples 27 to 29, in which the physical form was solid, dry feeling on use was observed, and the aqueous dispersion had very good smooth spreadability and excellent adhesiveness. The aqueous dispersion also had an excellent soft focus effect.

In this manner, it was confirmed that the inventive water-dispersion emulsion composition made it possible to pro-

TABLE 6

|  |  | Example 26 | Example 27 | Example 28 | Example 29 | Example 30 |
|---|---|---|---|---|---|---|
| Emulsion composition of Example 12 | | 100 | | | | |
| Emulsion composition of Example 15 | | | 100 | | | |
| Emulsion composition of Example 16 | | | | 100 | | |
| Emulsion composition of Example 17 | | | | | 100 | |
| Emulsion composition of Example 21 | | | | | | 100 |
| Solution of chloroplatinic acid-vinylsiloxane complex in toluene | | 0.1 | 0.1 | 0.1 | 0.1 | 0.1 |
| Polyoxyethylene lauryl ether (added number of moles of ethylene oxide = 9 mol) | | 0.1 | 0.1 | 0.1 | 0.1 | 0.1 |
| Appearance | Before curing reaction | Milky-white | Milky-white | Milky-white | Milky-white | Milky-white |
| | After curing reaction | Milky-white | Milky-white | Milky-white | Milky-white | Milky-white |
| Particle size measurement | Before curing reaction | 1.0 | 0.8 | 0.4 | 1.0 | 0.3 |
| | After curing reaction | 1.0 | 0.7 | 0.4 | 1.1 | 0.3 |
| Physical form of precipitated oil-based component | | Gum | Solid | Solid | Solid | Gum |
| Shape of solid content | | — | Spherical particles | Spherical particles | Spherical particles | — |

As in Table 6, an emulsion addition-cured composition having a milky-white appearance at 25° C. was obtained in Examples 26 to 30. In addition, it was observed from the particle size measurement that there was little change in particle size before and after the reaction. It can be conjectured from this that the curing reaction has little influence on aggregation or union between emulsion particles. Furthermore, the physical form of the precipitated oil-based component was gum in Examples 26 and 30, and solid in Examples 27 to 29. It can be conjectured that according to the combination of used raw materials, the physical form duce a water-dispersion emulsion composition having a milky-white appearance and in which the obtained emulsion has an average particle size of 2.0 μm or less when organopolysiloxanes having reactive functional groups such as hydrosilyl groups or olefinic unsaturated groups are used as an oil phase. In addition, it was confirmed that it was possible to perform an addition-curing reaction by adding a hydrosilylation catalyst and produce an emulsion addition-cured composition while maintaining the particle size. In addition, it was confirmed that the inventive emulsion addition-cured composition had reduced stickiness originating from anionic surfactant. Furthermore, it was confirmed that since the shape was of spherical particles, light diffusibility was excellent, and a soft focus effect of naturally hiding faults in the skin was high.

Comparative Examples 1 to 14

In a glass beaker were charged SFNa (KANEKA Surfactin, Kaneka Corporation) as (A) an anionic surfactant, organopolysiloxanes (1) and (2) as (B) an organopolysiloxane having at least two hydrosilyl groups in one molecule thereof, organopolysiloxanes (5) and (6) as (C) an organopolysiloxane having at least two olefinic unsaturated groups in one molecule thereof, glycerin, being a polyhydric alcohol, as (D) a monohydric or polyhydric alcohol, and a decamethylcyclopentasiloxane (KF-995) or a linear organopolysiloxane (KF-96A-6cs, the organopolysiloxane (7) shown in the following formula and the organopolysiloxane (8) shown in the following formula) as (G) a silicone oil not containing a hydrosilyl group or an olefinic unsaturated group by the composition shown in Table 7. The mixture was stirred and dissolved at room temperature by using a disper, and then (E) water was dropped thereto under room temperature to prepare an emulsion composition α (Comparative Examples 1 to 8). After that, (E) water was added to the obtained emulsion composition α under room temperature to prepare an emulsion composition (Comparative Examples 3 to 6). Furthermore, as shown in Table 8, water was further added to the emulsions obtained in Comparative Examples 1 to 6 to prepare emulsion compositions (Comparative Examples 9 to 14). 100 g of the obtained emulsion composition was added to 500 g of ethanol while stirring. The precipitated oil-based component alone was sampled by filtration and dried for 3 hours at 105° C. In Tables 7 and 8, the blended amounts are shown by mass %. Tables 7 and 8 show the evaluation of the appearance of the emulsions at 25° C., and the results of a pigment solubility test, a water dispersibility test, an oil dispersibility test, particle size measurement, and physical form of the precipitated oil-based component conducted in the same manner as in the Examples.

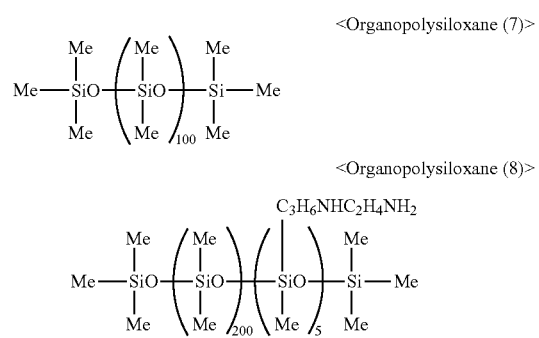

TABLE 7

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Formulated composition (mass %) | SFNa | 1.0 | 1.0 | 0.8 | 0.8 | 0.8 | 0.8 | 1.0 | 1.0 |
| | Glycerin | 21.0 | 21.0 | 16.8 | 16.8 | 16.8 | 16.8 | 21.0 | 21.0 |
| | KF-995 | 61 | | 48.8 | | | | | |
| | KF-96A-6cs | | 61 | | 48.8 | | | | |
| | Organopolysiloxane (1) | | | | | | | 9.7 | |
| | Organopolysiloxane (2) | | | | | | | | 2.3 |
| | Organopolysiloxane (5) | | | | | | | 51.3 | |
| | Organopolysiloxane (6) | | | | | | | | 58.7 |
| | Organopolysiloxane (7) | | | | | 48.8 | | | |
| | Organopolysiloxane (8) | | | | | | 48.8 | | |
| | Water | 17 | 17 | 33.6 | 33.6 | 33.6 | 33.6 | 17.0 | 17.0 |
| Total | | 100 | 100 | 100 | 100 | 100 | 100 | 100 | 100 |
| Appearance of emulsion composition | | Colorless, transparent | Colorless, transparent | Milky-white | Milky-white | Milky-white | Milky-white | Colorless, transparent | Colorless, transparent |

TABLE 7-continued

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Pigment solubility test | Water solubility | Homogeneously dissolved | Homogeneously dissolved | Homogeneously dissolved | Homogeneously dissolved | Homogeneously dissolved | Homogeneously dissolved | Homogeneously dissolved | Homogeneously dissolved |
|  | Oil solubility | Homogeneously dissolved | Homogeneously dissolved | Insoluble | Insoluble | Insoluble | Insoluble | Homogeneously dissolved | Homogeneously dissolved |
| Water dispersibility |  | Homogeneously dispersed | Homogeneously dispersed | Homogeneously dispersed | Homogeneously dispersed | Homogeneously dispersed | Homogeneously dispersed | Homogeneously dispersed | Homogeneously dispersed |
| Oil dispersibility |  | Separated | Separated | Separated | Separated | Separated | Separated | Separated | Separated |

As shown in the Table 7, an emulsion having a colorless, transparent appearance at 25° C. was obtained in Comparative Examples 1, 2, 7, and 8. In Comparative Examples 3 to 6, an emulsion having a milky-white appearance at 25° C. was obtained. When these emulsions were respectively dropped into water, every emulsion was homogeneously dispersed. Thus, dispersibility in water was confirmed. On the other hand, when the emulsions were respectively dropped into oil, none of the emulsions dispersed in the oil, and each was separated. In this manner, it was shown that the produced emulsion compositions had excellent water dispersibility.

The emulsions having the colorless, transparent appearance at 25° C. shown in Comparative Examples 1, 2, 7, and 8 homogeneously dissolved both the water-soluble pigment and the oil-soluble pigment. Thus, the emulsions were confirmed to have a bicontinuous structure. Meanwhile, the emulsions having the milky-white appearance at 25° C. shown in Comparative Examples 3 to 6 were homogeneously dissolved only in the water-soluble pigment. Thus, the emulsions were shown to be water-dispersion emulsions.

TABLE 8

|  |  | Comparative Example 9 | Comparative Example 10 | Comparative Example 11 | Comparative Example 12 | Comparative Example 13 | Comparative Example 14 |
|---|---|---|---|---|---|---|---|
| Formulated composition (mass %) | Emulsion composition of Comparative Example 1 | 25 |  |  |  |  |  |
|  | Emulsion composition of Comparative Example 2 |  | 25 |  |  |  |  |
|  | Emulsion composition of Comparative Example 3 |  |  | 25 |  |  |  |
|  | Emulsion composition of Comparative Example 4 |  |  |  | 25 |  |  |
|  | Emulsion composition of Comparative Example 5 |  |  |  |  | 25 |  |
|  | Emulsion composition of Comparative Example 6 |  |  |  |  |  | 25 |
|  | Water | 75 | 75 | 75 | 75 | 75 | 75 |
| Total |  | 100 | 100 | 100 | 100 | 100 | 100 |
| Appearance of emulsion composition |  | Milky-white | Milky-white | Milky-white | Milky-white | Milky-white | Milky-white |
| Pigment solubility test | Water solubility | Homogeneously dissolved | Homogeneously dissolved | Homogeneously dissolved | Homogeneously dissolved | Homogeneously dissolved | Homogeneously dissolved |
|  | Oil solubility | Insoluble | Insoluble | Insoluble | Insoluble | Insoluble | Insoluble |

TABLE 8-continued

|  | Comparative Example 9 | Comparative Example 10 | Comparative Example 11 | Comparative Example 12 | Comparative Example 13 | Comparative Example 14 |
| --- | --- | --- | --- | --- | --- | --- |
| Water dispersibility | Homogeneously dispersed | Homogeneously dispersed | Homogeneously dispersed | Homogeneously dispersed | Homogeneously dispersed | Homogeneously dispersed |
| Oil dispersibility | Separated | Separated | Separated | Separated | Separated | Separated |
| Average particle size/μm | 1.2 | 1.1 | 1.2 | 1.0 | 1.1 | 1.1 |
| Physical form of precipitated oil-based component | Liquid | Liquid | Liquid | Liquid | Liquid | Liquid |

As shown in the Table 8, the emulsion compositions were mixed with water by the formulation composition shown in Comparative Examples 9 to 14. In each of Comparative Examples 9 to 14, an emulsion having a milky-white appearance at 25° C. was obtained. In addition, when the emulsions were respectively dropped in water, each emulsion was homogeneously dispersed. Thus, dispersibility in water was confirmed. On the other hand, when the emulsions were respectively dropped in oil, none of the emulsions was dispersed in the oil, and each was separated. Thus, it was shown that the produced emulsion compositions had excellent water dispersibility. Meanwhile, the emulsions having the milky-white appearance at 25° C. shown in Comparative Examples 9 to 14 were homogeneously dissolved only in the water-soluble pigment. Thus, the emulsions were shown to be water-dispersion emulsions.

Each of the obtained emulsion compositions had an average particle size of 2.0 μm or less. In addition, the physical forms of the precipitated oil-based components were all liquid.

(Performance Evaluation)

About 0.02 g of each of the aqueous dispersions of Comparative Examples 9 to 14 prepared in the same manner as in Examples 26 to 30 was respectively dropped on the back of the hand by using a dropper, and spread with the finger to a size of about 2 cm in diameter. After air-drying for 3 minutes, this was rubbed hard with the finger. The aqueous dispersion had a stickiness originating from surfactant.

Comparative Examples 15 and 16

While maintaining a 200-mL glass beaker containing 100 g of an emulsion composition of Comparative Examples 7 and 8 having a colorless, transparent appearance obtained above at 20 to 25° C. on a stirring apparatus, a mixture of 0.1 g (5 ppm of platinum relative to the total amount of the emulsion composition) of a solution of a chloroplatinic acid-vinylsiloxane complex in toluene (platinum concentration: 0.5 wt %) and 0.1 g of a polyoxyethylene lauryl ether (added number of moles of ethylene oxide=9 mol) was added while stirring, and the resultant was stirred for 12 hours within the same temperature range as above. Thus, an addition-curing reaction of the organopolysiloxane (B) having hydrosilyl groups and the organopolysiloxane (C) having vinyl groups was performed to produce an emulsion addition-cured composition (Table 9). Progression of the reaction was confirmed by NMR measurement, since the peak attributable to vinyl groups had disappeared in each case. 100 g of the obtained emulsion addition-cured composition was added to 500 g of ethanol while stirring. The precipitated oil-based component alone was sampled by filtration and dried for 3 hours in an oven at 105° C. When the physical form of the oil-based component obtained by drying was solid, the shape of the oil-based component was observed with a scanning electron microscope. Table 9 shows the results of the evaluation of the appearance of the emulsion composition before the reaction and the addition-cured material thereof at 25° C., the physical form of the precipitated oil-based component, and the shape of the solid content observed with an electron microscope.

TABLE 9

|  | Comparative Example 15 | Comparative Example 16 |
| --- | --- | --- |
| Emulsion composition of Comparative Example 7 | 100 |  |
| Emulsion composition of Comparative Example 8 |  | 100 |
| Solution of chloroplatinic acid-vinylsiloxane complex in toluene | 0.1 | 0.1 |
| Polyoxyethylene lauryl ether (added number of moles of ethylene oxide = 9 mol) | 0.1 | 0.1 |
| Appearance  Before curing reaction | Colorless, transparent | Colorless, transparent |
|            After curing reaction | Colorless, transparent | Colorless, transparent |
| Physical form of precipitated oil-based component | Solid | Solid |
| Shape of solid content | Bicontinuous structure | Bicontinuous structure |

As shown in the Table 9, a microemulsion addition-cured composition having a colorless, transparent appearance was obtained in Comparative Examples 15 and 16 by the shown formulation composition. Furthermore, the physical form of the precipitated oil-based component was solid. When the obtained solid component was observed with an electron microscope, each had the shape of a bicontinuous structure. This suggested that the curing reaction had progressed while maintaining the state of a D phase.

(Performance Evaluation)

5 g of the emulsion addition-cured compositions of Comparative Examples 15 and 16 were respectively dispersed in 95 ml of water to prepare an aqueous dispersion thereof. About 0.02 g of the prepared aqueous dispersion was dropped on the back of the hand by using a dropper, and spread with the finger to a size of about 2 cm in diameter. After air-drying for 3 minutes, this was rubbed hard with the finger. The aqueous dispersion of the emulsion addition-cured composition in Comparative Examples 15 and 16 had a somewhat reduced stickiness compared with Comparative Examples 7 and 8. However, adhesiveness to the skin was low compared with Examples 27 to 29, and the aqueous dispersion was inclined to fall off when rubbed. Furthermore, the soft focus effect of naturally hiding faults in the skin was weak. This can be considered to be because light diffusibility is low due to the shape not being of spherical particles.

Example 31 and Comparative Examples 17 and 18

[Evaluation of Properties of Cosmetic]

Using cosmetics prepared in the following manner by using the emulsion addition-cured composition of Example 27 and the emulsions of Comparative Examples 4 and 16 (Example 31 and Comparative Examples 17 and 18), the feeling on use (absence of stickiness) and refreshing feeling (freshness) when applied to the skin and temporal stability (state after preserving at 50° C. for 1 month) of the prepared cosmetic were evaluated by the evaluation criteria shown in Table 10. The results were judged according to the following judgement criteria on the basis of the average values of experts (10 experts). The results are given together in Table 11.

<Preparation of Cosmetics>

By mixing the component (2) in the component (1) in Table 11 uniformly, water-dispersion lotions (cosmetics of Example 31 and Comparative Examples 17 and 18) were obtained.

TABLE 10

Evaluation criteria

| Item | Feeling on use | Refreshing feeling | Temporal stability |
|---|---|---|---|
| 5 points | Favorable | Favorable | Favorable |
| 4 points | Somewhat favorable | Somewhat favorable | Somewhat favorable |
| 3 points | Normal | Normal | Normal |
| 2 points | Somewhat unfavorable | Somewhat unfavorable | Somewhat unfavorable |
| 1 point | Unfavorable | Unfavorable | Unfavorable |

Judgement Criteria

Excellent: the average was 4.5 points or more

Good: the average was 3.5 points or more and less than 4.5 points

Fair: the average was 2.5 points or more and less than 3.5 points

Poor: the average was 1.5 points or more and less than 2.5 points

Bad: the average was less than 1.5 points

TABLE 11

| Composition (%) | | Example 31 | Comparative Example 17 | Comparative Example 18 |
|---|---|---|---|---|
| (1) | Emulsion composition obtained in Example 27 | 5 | — | — |
| | Emulsion composition obtained in Comparative Example 4 | — | 5 | — |

TABLE 11-continued

| Composition (%) | | Example 31 | Comparative Example 17 | Comparative Example 18 |
|---|---|---|---|---|
| | Emulsion composition obtained in Comparative Example 16 | — | — | 5 |
| (2) | Butyleneglycol | 5 | 5 | 5 |
| | Sodium chloride | 0.5 | 0.5 | 0.5 |
| | Preservative | Appropriate amount | Appropriate amount | Appropriate amount |
| | Purified water | Balance | Balance | Balance |
| Total | | 100 | 100 | 100 |
| Evaluation | Feeling on use | Excellent | Fair | Excellent |
| | Refreshing feeling | Excellent | Fair | Excellent |
| | Temporal stability | Excellent | Fair | Excellent |
| | Abrasion resistance | Excellent | Poor | Fair |
| | Soft focus property | Excellent | Poor | Poor |

It was revealed from the results of Table 11 that the inventive cosmetic (water-dispersion lotion) had favorable feeling on use (absence of stickiness), refreshing feeling (freshness), and temporal stability (state after preserving at 50° C. for 1 month).

In addition, the inventive cosmetic was particularly excellent in cosmetic sustainability, abrasion resistance, and soft focus effect.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A water-dispersion emulsion composition comprising:
   (A) an anionic surfactant, which is a natural surfactant comprising a cyclic peptide group shown in the following formula (III):

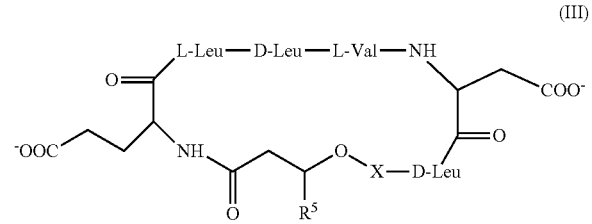

wherein in the formula, X represents an amino acid residue selected from leucine, isoleucine, and valine, each $R^5$ independently represents a substituted or unsubstituted monovalent hydrocarbon group having 9 to 18 carbon atoms and not having an aliphatic unsaturated bond, L-Leu indicates L-leucine, D-Leu indicates D-leucine, L-Val indicates L-valine, and a counter ion of a carboxy group comprises an alkali metal ion;

(B) an organopolysiloxane having at least two hydrosilyl groups in one molecule thereof shown in the following formula (I):

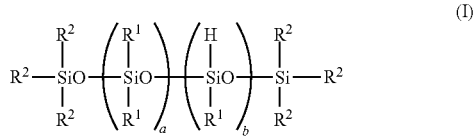

wherein each $R^1$ independently represents a substituted or unsubstituted monovalent hydrocarbon group having 1 to 30 carbon atoms and not having an aliphatic unsaturated bond, each $R^2$ independently represents a substituted or unsubstituted monovalent hydrocarbon group having 1 to 30 carbon atoms and not having an aliphatic unsaturated bond, some optionally being a hydrogen atom, "a" satisfies $0 \leq a \leq 300$, "b" satisfies $0 \leq b \leq 50$, and $5 \leq a+b \leq 350$, and when $b=0$, any two or more $R^2$ represent a hydrogen atom;

(C) an organopolysiloxane having at least two olefinic unsaturated groups in one molecule thereof shown in the following formula (II):

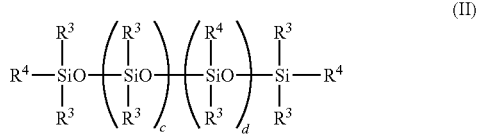

wherein each $R^3$ independently represents a substituted or unsubstituted monovalent hydrocarbon group having 1 to 30 carbon atoms and not having an aliphatic unsaturated bond, each $R^4$ independently represents a substituted or unsubstituted monovalent hydrocarbon group having 2 to 30 carbon atoms and having an aliphatic unsaturated bond or is $R^3$, "c" satisfies $0 \leq c \leq 500$, "d" satisfies $0 \leq d \leq 50$, and $5 \leq c+d \leq 550$, and when $d=0$, each $R^4$ independently represents a substituted or unsubstituted monovalent hydrocarbon group having 2 to 30 carbon atoms and having an aliphatic unsaturated bond;

(D) a monohydric or polyhydric alcohol; and (E) water, wherein the water-dispersion emulsion composition has a milky-white appearance at 25° C. and has emulsion particles that are spherical particles having an average particle size of 2.0 μm or less.

2. The water-dispersion emulsion composition according to claim 1, wherein the water-dispersion emulsion composition is dispersible when added in water.

3. The water-dispersion emulsion composition according to claim 1, wherein the component (A) in the water-dispersion emulsion composition is contained in an amount of 0.1 to 10 wt %.

4. The water-dispersion emulsion composition according to claim 1, wherein the component (D) is glycerin.

5. The water-dispersion emulsion composition according to claim 1, wherein the emulsion particles have an average particle size of 1.0 μm or less.

6. The water-dispersion emulsion composition according to claim 1, wherein the emulsion particles have an average particle size of 500 nm or less.

7. The water-dispersion emulsion composition according to claim 1, wherein there is 0.5 to 3.0 mol of the hydrosilyl groups contained in the component (B) relative to 1 mol of the olefinic unsaturated groups contained in the component (C).

8. The water-dispersion emulsion composition according to claim 1, wherein the water-dispersion emulsion composition is addition-cured by adding (F) a hydrosilylation catalyst.

9. An emulsion addition-cured composition obtained by addition-curing the water-dispersion emulsion composition according to claim 8, wherein the emulsion addition-cured composition has a milky-white appearance at 25° C. and has emulsion particles that are spherical particles having an average particle size of 2.0 μm or less.

10. The emulsion addition-cured composition according to claim 9, wherein an extract that is obtained when addition-cured materials of the component (B) and the component (C) are extracted from the emulsion addition-cured composition is solid.

11. The emulsion addition-cured composition according to claim 10, wherein the solid extract has a shape of spherical particles.

12. A cosmetic comprising the emulsion addition-cured composition according to claim 9.

13. A method for manufacturing a water-dispersion emulsion composition comprising the steps of:
(1) preparing a mixed liquid containing the components (A) to (D);
(2) adding the component (E) to the mixed liquid to obtain a transparent or translucent emulsion composition α; and
(3) further adding the component (E) to the emulsion composition α to obtain the water-dispersion emulsion composition according to claim 1.

14. The method for manufacturing a water-dispersion emulsion composition according to claim 13, wherein the emulsion composition α has a bicontinuous structure.

15. A method for manufacturing an emulsion addition-cured composition, the method being the method for manufacturing a water-dispersion emulsion composition according to claim 13 further comprising a step of adding (F) a hydrosilylation catalyst.

* * * * *